US012334645B2

(12) United States Patent
Vollmer et al.

(10) Patent No.: US 12,334,645 B2
(45) Date of Patent: Jun. 17, 2025

(54) DUAL-POLARIZED RADIATOR ARRANGEMENT FOR A MOBILE COMMUNICATION ANTENNA AND A MOBILE COMMUNICATION ANTENNA COMPRISING AT LEAST ONE DUAL-POLARIZED RADIATOR ARRANGEMENT

(71) Applicant: Telefonaktiebolaget LM Ericsson (publ), Stockholm (SE)

(72) Inventors: Andreas Vollmer, Rosenheim (DE); Dan Fleancu, Griesstätt (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 241 days.

(21) Appl. No.: 18/031,844

(22) PCT Filed: Oct. 15, 2020

(86) PCT No.: PCT/EP2020/079025

§ 371 (c)(1),
(2) Date: Apr. 13, 2023

(87) PCT Pub. No.: WO2022/078604

PCT Pub. Date: Apr. 21, 2022

(65) Prior Publication Data

US 2023/0395998 A1 Dec. 7, 2023

(51) Int. Cl.
*H01Q 25/00* (2006.01)
*H01Q 1/24* (2006.01)
(Continued)

(52) U.S. Cl.
CPC ............. *H01Q 25/001* (2013.01); *H01Q 1/24* (2013.01); *H01Q 5/48* (2015.01); *H01Q 19/108* (2013.01); *H01Q 21/24* (2013.01); *H01Q 21/26* (2013.01)

(58) Field of Classification Search
CPC ...... H01Q 25/001; H01Q 1/24; H01Q 19/108; H01Q 21/24; H01Q 5/48; H01Q 21/26
See application file for complete search history.

(56) References Cited

U.S. PATENT DOCUMENTS 7,692,601 B2 * 4/2010 Bisiules ................. H01Q 21/24 343/803
2004/0183739 A1 * 9/2004 Bisiules ................. H01Q 5/378 343/793

(Continued)

FOREIGN PATENT DOCUMENTS

CN 107394394 A 11/2017
CN 108461904 A 8/2018

(Continued)

OTHER PUBLICATIONS

International Search Report and Written Opinion issued in International Application No. PCT/EP2020/079025 dated Jul. 6, 2021 (14 pages).

*Primary Examiner* — Hai V Tran
(74) *Attorney, Agent, or Firm* — Rothwell, Figg, Ernst & Manbeck, P.C.

(57) ABSTRACT

A dual-polarized radiator arrangement (1) comprises four radiator segments (4*a*, 4*b*, 4*c*, 4*d*) and a reflector arrangement (2). The radiator segments (4*a*, 4*b*, 4*c*, 4*d*) are arranged such that they form a square arrangement. Each radiator segment (4*a*, 4*b*, 4*c*, 4*d*) comprises a minor radiating surface (5) having a first and a second end (5*a*, 5*b*) and a feeding assembly (9). Each radiator segment (4*a*, 4*b*, 4*c*, 4*d*) comprises a first and a second main radiating surface (8*a*, 8*b*) arranged in the area of the first end (5*a*) and the second end (5*b*) of the minor radiating surface (5) and miming in the direction of the reflector arrangement (2). The first and second main radiating surfaces (8*a*, 8*b*) protrude beyond the respective first and second ends (5*a*, 5*b*) of the minor radiating surface (5) in the longitudinal direction (6*a*) of the minor radiating surface (5).

17 Claims, 12 Drawing Sheets

(51) Int. Cl.

| | |
|---|---|
| ***H01Q 5/48*** | (2015.01) |
| ***H01Q 19/10*** | (2006.01) |
| ***H01Q 21/24*** | (2006.01) |
| ***H01Q 21/26*** | (2006.01) |

(56) References Cited

U.S. PATENT DOCUMENTS

| | | | | |
|---|---|---|---|---|
| 2005/0253769 | A1* | 11/2005 | Timofeev | H01Q 21/08 343/810 |
| 2007/0241983 | A1* | 10/2007 | Cao | H01Q 21/26 343/797 |
| 2012/0146871 | A1* | 6/2012 | Choi | H01Q 21/26 343/795 |
| 2012/0169561 | A1* | 7/2012 | Bin Basri | H01Q 21/062 343/814 |
| 2013/0307743 | A1* | 11/2013 | Moon | H01Q 21/08 343/833 |
| 2014/0111396 | A1* | 4/2014 | Hyjazie | H01Q 21/26 343/893 |
| 2019/0036226 | A1* | 1/2019 | Ding | H01Q 19/108 |
| 2022/0352649 | A1* | 11/2022 | Wu | H01Q 9/26 |

FOREIGN PATENT DOCUMENTS

| | | | |
|---|---|---|---|
| WO | 2012/055883 | A1 | 5/2012 |
| WO | 2020/023997 | A1 | 2/2020 |

* cited by examiner

DUAL-POLARIZED RADIATOR ARRANGEMENT FOR A MOBILE COMMUNICATION ANTENNA AND A MOBILE COMMUNICATION ANTENNA COMPRISING AT LEAST ONE DUAL-POLARIZED RADIATOR ARRANGEMENT

CROSS REFERENCE TO RELATED APPLICATIONS

This application is a 35 U.S.C. § 371 National Stage of International Patent Application No. PCT/EP2020/079025, filed 2020 Oct. 15.

TECHNICAL FIELD

The invention relates to a dual-polarized radiator arrangement for a mobile communication antenna and a mobile communication antenna comprising at least one dual-polarized radiator arrangement.

BACKGROUND

A mobile communication antenna comprises a plurality of components. In order to support various mobile communication bands different types of radiators have to be used. The size of the radiators varies depending on the frequency range. Radiators used for transmitting and/or receiving communication signals in a lower frequency range have larger dimensions than radiators used for transmitting and/or receiving communication signals in a higher frequency range. Mobile communication antennas having smaller dimensions are in favor, because the rents for the installation site are less expensive and the manufacturing costs are also reduced.

WO 2012/055883 A1 describes a dual-polarized radiating element which comprises four dipoles each comprising one stand and two arms. A first arm and a second aim belonging to two adjacent dipoles, form a straight radiating strand composed of a single part and the four radiating strands are arranged so as to form a disjoint square at the corners. The antenna comprises at least one first radiating element operating in a first frequency band and at least one second radiating element operating in a second frequency band and having at least one dipole that is arranged at the center of the square formed by the radiating strands of the first radiating element, the radiating elements being arranged above a common reflector such that the transverse strands of the first radiating elements are located between two adjacent second radiating elements.

The dimensions of the dual-polarized radiating element comprising the four dipoles are relatively large to ensure proper operation.

SUMMARY

An object of the present invention is seen in building an ultra-compact dual-polarized radiator arrangement for mobile communication antenna and a mobile communication antenna comprising such a dual-polarized radiator arrangement. The dual-polarized radiator arrangement should also comprise a high port isolation and high gain and symmetrical farfield properties.

The object is solved by a dual-polarized radiator arrangement for mobile communication antenna according to claim 1 and by the mobile communication antenna comprising at least one dual-polarized radiator arrangement according to claim 15. Claims 2 to 14 describe further embodiments of the dual-polarized radiator arrangement.

The dual-polarized radiator arrangement for mobile communication antenna according to the present invention comprises four radiator segments and a reflector arrangement. The four radiator segments are arranged on the reflector arrangement. The reflector arrangement could be made of a single electrically conductive piece or of a plurality of electrically conductive pieces. Those pieces could be metal sheets, metal layers of printed circuit boards or even plastics covered with a metal layer or plastics structured with metal forms, e.g. in an electroplating process and/or electroless plating process. Each radiator segment is arranged at a substantially 90° rotation relative to its two neighboring radiator segments so that the four radiator segments form a square arrangement enclosing a receiving area. The wording "substantially 90° rotation" has to be interpreted in such a way, that the deviation of less than 5°, 4°, 3°, 2° or less than 1° is possible. The "receiving area" could be named as well as "effective radiator aperture area" from a more theoretical perspective. The receiving area could also be named as well as "characteristic radiator aperture" from more practical perspective.

Each radiator segment comprises a minor radiating surface having a first end and a second end. The wording "surface" could also be described as plane. The minor radiating surface is arranged substantially parallel to and spaced apart from the reflector arrangement. The wording "substantially parallel" has to be interpreted in such a way that an angle between the minor radiating surface and the reflector arrangement of less than 10°, 8°, 7°, 5° or less than 3° is possible. The minor radiating surface of each radiator segment extends in the longitudinal direction and in the transverse direction. The extension in the longitudinal direction is larger than the extension in the transverse direction. Furthermore, each radiator segment comprises a feeding assembly. Each radiator segment also comprises a first and a second main radiating surface. The first main radiating surface is arranged at an area of the first end of the minor radiating surface and runs in the direction of the reflector arrangement. The second main radiating surface is arranged at an area of the second end of the minor radiating surface and also runs in the direction of the reflector arrangement. The first main radiator surface protrudes beyond the first end of the minor radiating surface in the longitudinal direction of the minor radiating surface. The same is also true for the second main radiating surface which protrudes beyond the second end of the minor radiating surface in the longitudinal direction of the minor radiating surface.

The first main radiating surface could also be named as first main radiating structure, especially first main radiating planar structure. The second main radiating surface could also be named as second main radiating structure, especially second main radiating planar structure. The minor radiating surface could also be named as minor radiating structure, especially minor radiating planar structure.

It is very beneficial that additional first and second main radiating surfaces are used. Those main radiating surfaces which protrude beyond the respective end of the minor radiating surface increase the bandwidth of the dual-polarized radiator arrangement. The amount of the increase was surprisingly good. As a result, the dual-polarized radiator arrangement can be used for frequencies between for example 698 MHz and 960 MHz. However, the dimension of the respective radiator segments is much smaller than those known from the state-of-the-art.

In a further embodiment, the feeding assembly of each radiator segment comprises a first feed structure and a second feed structure. The first feed structure extends from the region of the first end of the minor radiating surface towards the reflector arrangement. The second feed structure extends from the region of the second end of the minor radiating surface towards the reflector arrangement. The first main radiating surface is arranged in the transverse direction of the minor radiating surface at a distance from the first feed structure in the direction of the reflector arrangement. This means that both the first main radiating surface and a first feed structure run towards the reflector arrangement but are spaced from each other. The same is also true for the second main radiating surface which is arranged in transverse direction of the minor radiating surface at a distance from the second feed structure in the direction of the reflector arrangement. Having the respective feed structure run at a distance from the respective main radiating surface allows that the respective main radiating surface protrudes from the respective first or second end from the minor radiating surface. Thus, a very compact structure is achieved.

By having the respective feed structure between the main radiating surfaces of the dual-polarized radiator arrangement and at least one more dual-polarized radiator system dependencies between radiators are decreased, respectively between the main radiating surfaces. There are high electrical fields between the main radiating surfaces, the coupling surfaces and the feed structures. The main radiating surfaces are capacitively loaded by the coupling surfaces and/or the respective feed structure. Thus, a compact structure with high isolation between the polarizations and low coupling between the dual-polarized radiator arrangement and at least one dual-polarized radiator system inside the dual-polarized radiator arrangement can be achieved.

Furthermore, the design and electrical parameters of the at least one dual-polarized radiator arrangement are more independent from the design and electrical parameters of the at least one dual-polarized radiator system inside.

In another embodiment, the first feed structure of each radiator segment is bent in the direction of the nearest second feed structure of the respective adjacent radiator segment. In addition, the second feed structure of each radiator segment is bent in the direction of the nearest first feed structure of the respective adjacent radiator segment. This means that the first and the second feed structures of the respective adjacent radiator segments are bent towards each other and are aligned parallel to each other or even run through the same plane. Such an arrangement allows that the neighboring feed structures of different radiator segments can be fed by using the same feeding system.

In another embodiment, the dual-polarized radiator arrangement comprises four feeding systems. Each feeding system comprises a first feed section and second feed section. Both feed sections are galvanically connected to each other. Preferably each feeding system is made of a single piece. Each feeding system is assigned to a first feed structure and a second feed structure of two adjacent radiator segments.

In General, the first feed section of the respective feeding system runs substantially parallel to the first or second feed structure of the respective radiator segment and the second feed section of the respective feeding system runs substantially parallel to the nearest second or first feed structure of the radiator segment adjacent to the respective radiator segment of the first or second feed structure. However, the first feed section faces the first or second feed structure of the respective radiator segment. The same is also true for the second feed section. As a result, a balun is formed. The wording "substantially parallel" has to be interpreted in such a way that an angle between the minor radiating surface and the reflector arrangement of less than 10°, 8°, 7°, 5° or less than 3° is possible. Preferably, a dielectric is placed between the first and/or second feed section of the respective feeding system and the corresponding first and/or second feed structure of the respective radiator segments.

It could also be that the first feed section of the respective feeding system runs parallel to the first feed structure of the respective radiator segment and the second feed section of the respective feeding system runs parallel to the nearest second feed structure of the radiator segment adjacent to the respective radiator segment. Alternatively, the first feed section of the respective feeding systems runs parallel to the second feed structure of the respective radiator segment and the second feed section of the respective feeding system runs parallel to the nearest first feed structure of the radiator segment adjacent to the respective radiator segment.

In another embodiment, the first feed sections of the first and third feeding systems are connected together, preferably made of a single piece. They are further configured to transmit and/or receive a mobile radio signal in a first polarization. The first feeding system is adjacent to the first feed structure of the first radiator segment and to the second feed structure of the fourth radiator segment. The third feeding system is adjacent to the first feed structure of the third radiator segment and to the second feed structure of the second radiator segment. Preferably, the first feed section of the first feeding system is adjacent to the first feed structure of the first radiator segment and the second feed section of the first feeding system is adjacent to the second feed structure of the fourth radiator segment. The first feed section of the third feeding system is adjacent to the second feed structure of the second radiator segment and the second feed section of the third feeding system is adjacent to the first feed structure of the third radiator segment. On the other hand, the first feed sections of the second and fourth feeding system are also connected together, preferably made of a single piece. They are configured to transmit and/or receive a mobile radio signal in a second polarization. The first and the second polarization are preferably orthogonal to each other. The second feeding system is adjacent to the first feed structure of the second radiator segment and to the second feed structure of the first radiator segment. The fourth feeding system is adjacent to the first feed structure of the fourth radiator segment and to the second feed structure of the third radiator segment. Preferably, the first feed section of the second feeding system is adjacent to the first feed structure of the second radiator segment and the second feed section of the second feeding system is adjacent to the second feed structure of the first radiator segment. The first feed section of the fourth feeding system is adjacent to the second feed structure of the third radiator segment and the second feed section of the fourth feeding system is adjacent to the first feed structure of the fourth radiator segment. The wording "adjacent" has to be interpreted in such a way that a capacitive coupling occurs between the respective feed section and the respective feed structure. This means that the respective feed sections and the respective feed structure at least partly overlaps.

In another embodiment, the first feed section of the first feeding system is adjacent to the first feed structure of the first radiator segment and the second feed section of the first feeding system is adjacent to the second feed structure of the fourth radiator segment. The first feed section of the third feeding system is adjacent to the first feed structure of the third radiator segment and the second feed section of the third feeding system is adjacent to the second feed structure of the second radiator segment. On the other hand, the first feed section of the second feeding system is adjacent to the first feed structure of the second radiator segment and the second feed section of the second feeding system is adjacent to the second feed structure of the first radiator segment. The first feed section of the fourth feeding system is adjacent to the first feed structure of the fourth radiator segment and wherein the second feed section of the fourth feeding system is adjacent to the second feed structure of the third radiator segment.

In general, the first feed section of the first feeding system is adjacent (arranged next) to the first feed structure of the first radiator segment or to the second feed structure of the fourth radiator segment. The second feed section of the first feeding system is adjacent (arranged next) to the second feed structure of the fourth radiator segment or to the first feed structure of the first radiator segment.

The first feed section of the third feeding system is adjacent (arranged next) to the first feed structure of the third radiator segment or to the second feed structure of the second radiator segment. The second feed section of the third feeding system is adjacent (arranged next) to the second feed structure of the second radiator segment or to the first feed structure of the third radiator segment.

The first feed section of the second feeding system is adjacent (arranged next) to the first feed structure of the second radiator segment or to second feed structure of the first radiator segment. The second feed section of the second feeding system is adjacent (arranged next) to the second feed structure of the first radiator segment or to the first feed structure of the second radiator segment.

The first feed section of the fourth feeding system is adjacent (arranged next) to the first feed structure of the fourth radiator segment or to the second feed structure of the third radiator segment. The second feed section of the fourth feeding system is adjacent (arranged next) to the second feed structure of the third radiator segment or to the first feed structure of the fourth radiator segment.

In another embodiment, the first feed structure of the respective radiator segment is galvanically connected to the reflector arrangement or capacitively coupled to the reflector arrangement. The first feed structure or the respective feed structure which is adjacent to the respective first feed section of the respective feeding system could also end at a distance spaced apart from the reflector arrangement. The second feed structure of the respective radiator segment could also be galvanically connected to the reflector arrangement or capacitively coupled to the reflector arrangement. The second feed structure or the respective feed structure which is adjacent to the respective second feed section of the respective feeding system could also end at a distance spaced apart from the reflector arrangement. The distance could be for example more than 5 mm, 10 mm, 50 mm, 20 mm or more than 25 mm, but preferably less than 50 mm, 45 mm, 40 mm or preferably less than 35 mm.

In another embodiment, the first and second feed structures of each radiator segment comprise a coupling surface. The coupling surfaces of the first and second feed structures of adjacent radiator segments are aligned parallel to each other thereby facing each other, resulting in a capacitive coupling. The wording "coupling surface" could also be named to "coupling structure". it could also be possible to draft an independent claim 1 comprising the coupling surfaces instead of the first and second main radiating surface. The first and second main radiating surface could then be added as a dependent claim. Those coupling surfaces also increase the frequency range over which the dual-polarized radiator arrangement can be used.

In another embodiment, a holding device is provided. The holding device is configured to hold the radiator segments in position. The holding device comprises at least four holding arms. Each holding aim consists of or comprises the dielectric material. Each holding aim further engages into two adjacent coupling surfaces. The holding device is preferably made of a plastic material and more preferably made of a single piece. The holding arms are preferably connected to each other by a base body.

In another embodiment, each minor radiating surface of the four radiator segments comprises an inner edge. The inner edge runs in longitudinal direction of the minor radiating surface and points towards the receiving area. Furthermore, each minor radiating surface also comprises an outer edge which extends in the longitudinal direction of the minor radiating surface. The outer edge is spaced apart from the inner edge in the transverse direction of the minor radiating surface. The first feed structure of each radiator segment is located (arranged) at the inner edge of the respective minor radiating surface. The second feed structure of each radiator segment is located (arranged) at the inner edge of the respective minor radiating surface. The first main radiating surface of each radiator segment is arranged at the outer edge of the respective minor radiating surface. The same is true for the second main radiating surface which is also arranged at the outer edge of the respective minor radiating surface. As a result, the respective feed structure does not engage with the respective main radiating surface. The dual-polarized radiator arrangement can be constructed compactly.

In another embodiment, the first and second main radiating surfaces of at least one or all of the respective radiator segments are connected to each other via a connecting surface. This increases the total surface which is arranged in vertical direction. The connecting surface also runs in longitudinal direction. The connecting surface could also be named connecting structure or especially connecting planar structure.

In another embodiment, an auxiliary radiator surface is provided. The auxiliary radiator surface is arranged on the minor radiating surface between the first and the second main radiating surfaces of the at least one or all radiator segments and extends in the direction of the reflector arrangement. This enhances the electrical properties of the dual-polarized radiator arrangement. The auxiliary radiator surface could also be named as auxiliary radiator structure or more preferably as auxiliary radiator planar structure.

In another embodiment, the at least one auxiliary radiator surface extends further in the direction of the reflector arrangement than the first and second main radiating surfaces of the respective radiator segment.

In another embodiment, the auxiliary radiator surface is inclined in the direction of the receiving area. If a dual-polarized radiator system is arranged within the receiving area of the dual-polarized radiator arrangement, then the radiation properties of this dual-polarized radiator system could be increased.

In another embodiment, the auxiliary radiator surface is located at the inner edge or the outer edge of the minor radiating surface of the respective radiator segment.

The mobile communication antenna according to the present invention comprises at least one dual-polarized radiator arrangement as described before. The mobile communication antenna also comprises at least one dual-polarized radiator system. The dual-polarized radiator system is configured to transmit and/or receive mobile radio signals in two different polarizations. The at least one dual-polarized radiator system is configured to be operable in a frequency range with is above the frequency range of the dual-polarized radiator arrangement. The at least one dual-polarized radiator system is arranged in the receiving area of the at least one dual-polarized radiator arrangement. In addition, a plurality of dual-polarized high-band radiators is provided. They are configured to transmit and/or receive mobile radio signals in two different polarizations. The plurality of dual-polarized high-band radiators are configured to be operable in a frequency range which is above the frequency range of the dual-polarized radiator system. The plurality of dual-polarized high-band radiators are arranged on the reflector arrangement.

Preferably, the plurality of dual-polarized high-band radiators are a plurality of dual-polarized high-band patch radiators or dual-polarized high-band dipole radiators.

The dual-polarized radiator arrangement could also be named as dual-polarized low band radiator. The dual-polarized radiator system could also be named as dual-polarized mid band radiator.

The dual-polarized radiator arrangement can preferably be operated in a frequency range of 698 to 960 MHz. The dual-polarized radiator system can preferably be operated in a frequency range of 1427 to 2700 MHz or 1695 to 2700 MHz. The dual-polarized high-band radiators could preferably be operated in a frequency range of 3300 to 3800 MHz or 3300 to 4200 MHz.

In another embodiment, at least one subreflector is arranged between the at least one dual-polarized radiator system and the plurality of dual-polarized high-band radiators. The at least one subreflector expands mainly parallel to the reflector arrangement 2. The at least one subreflector could be made of a single electrically conductive piece or of a plurality of electrically conductive pieces. Those pieces could be metal sheets, metal layers of printed circuit boards or even plastics covered with a metal layer or plastics structured with metal forms, e.g. in an electroplating process and/or electroless plating process. The at least one subreflector could have an electrically reflective metal structure and/or directional structure for at least one dual-polarized radiator system 101. Furthermore, the at least one subreflector could have an electrically transparent metal structure and/or directional structure for the plurality of dual-polarized high-band radiators. Preferably, the at least one subreflector is made as planar lens structure and/or metamaterial structure and/or a frequency-selective surface (FFS).

In another embodiment, the holding device 25 and the subreflector 26 are made as one single part, preferably made as one plastic molded part or preferably made as one molded interconnect device (MID) with partial metallization on at least one side.

BRIEF DESCRIPTION OF THE DRAWINGS

Different embodiments of the invention will be described in the following, by way of example and with reference to the drawings. The same elements are provided with the same reference signs. The figures show in detail.

DETAILED DESCRIPTION

Figure 1:
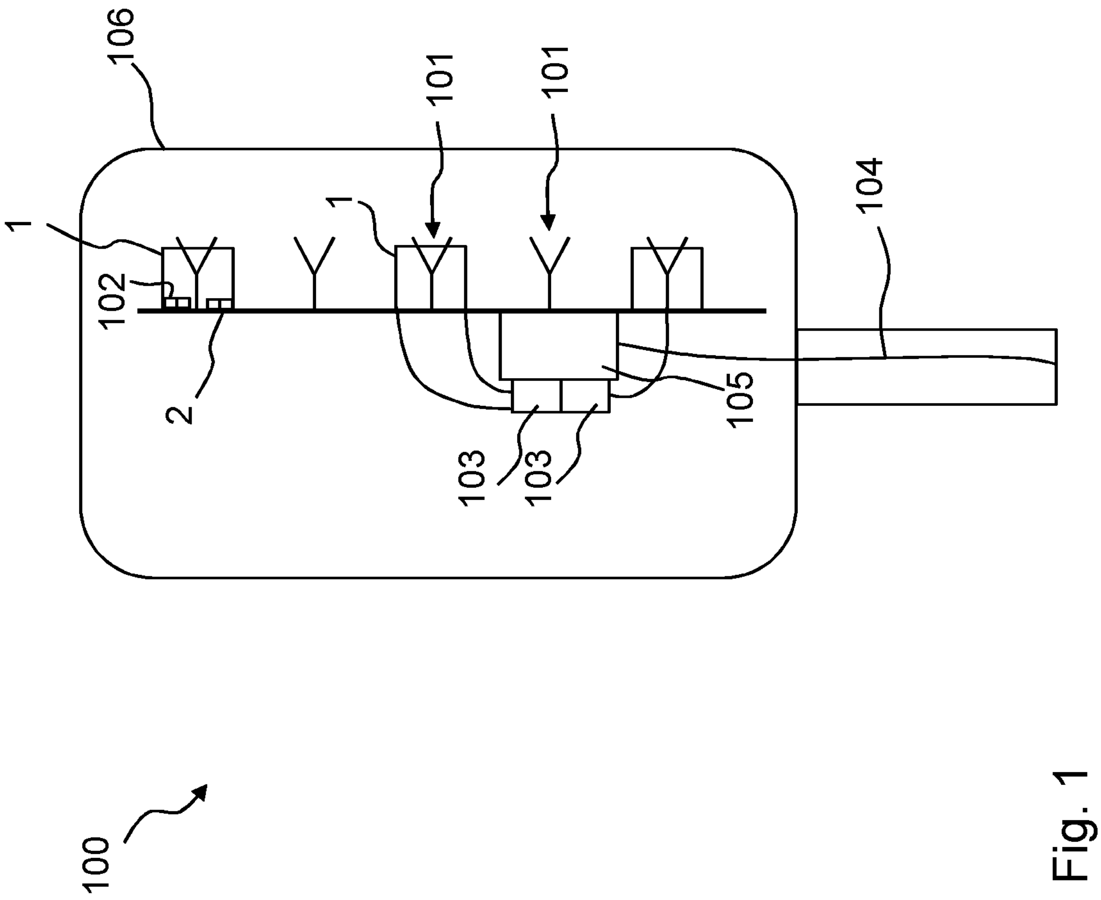
FIG. 1: a mobile communication antenna with at least one dual-polarized radiator arrangement according to the present invention.

FIG. 1 shows a mobile communication antenna 100 with at least one dual-polarized radiator arrangement 1 and at least one dual-polarized radiator system 101. There is also a reflector arrangement 2 on which the at least one dual-polarized radiator arrangement 1 and the at least one dual-polarized radiator system 101 are arranged. The at least one dual-polarized radiator system 101 and the at least one dual-polarized radiator arrangement 1 are arranged on a first side of the reflector arrangement 2. At least a plurality of dual-polarized high-band radiators 102 could also be arranged on that side.

Preferably, a plurality of dual-polarized radiator arrangements 1 are used. They are spaced apart from each other in longitudinal direction of the mobile communication antenna 100. As will be described below, each dual-polarized radiator arrangement 1 encloses a receiving area 3. At least one dual-polarized radiator system 101 is arranged in the receiving area 3. Between two dual-polarized radiator arrangements 1 another dual-polarized radiator system 101 is arranged. There could also a second column comprising additional dual-polarized radiator arrangements 1 and dual-polarized radiator systems 101. The same is also true for the plurality of dual-polarized high-band radiators 102. They could be arranged on both columns. There could even be more than two columns. The dual-polarized high-band radiators 102 are arranged closer to the reflector arrangement 2 compared to the dual-polarized radiator arrangements 1 and the dual-polarized radiator systems 101.

The distance between two dual-polarized radiator arrangements 1 is preferably between $\lambda/2$ or $\lambda$, wherein $\lambda$ is the wave length of the mid-frequency of the frequency range in which the dual-polarized radiator arrangement 1 is operated. The same is also true for the dual-polarized radiator systems 101 and/or for the dual-polarized high-band radiators 102.

The dual-polarized radiator arrangement 1, the dual-polarized radiator system 101 and the dual-polarized high-band radiators are configured to transmit and/or receive mobile communication signals in two orthogonal polarizations. The orthogonal polarizations could be for example ±45°, circular or elliptic.

On the second side of the reflector arrangement 2, a phase shifter arrangement 103 for each of the two polarizations for the dual-polarized radiator arrangement 1, the dual-polarized radiator system 101 and/or the dual-polarized high-band radiators 102 could be arranged. In addition, a matching network could also be provided. Furthermore, a power amplifier configured to amplify signals which are intended to be transmitted through the mobile communication antenna 100 to various mobile devices could also be arranged on the second side of the reflector arrangement 2. Alternatively or in addition, especially in an active antenna scenario, a low noise amplifier could also be arranged on the second side of the reflector arrangement 2. Using the low noise amplifier (LNA) signals which are received through the mobile communication antenna 100 from various mobile devices could be amplified before being sent to the base station (not shown) via the feeder cables 104. Alternatively or furthermore, especially in an active or passive antenna scenario, a combiner 105 could also be arranged on the first or second side of the reflector arrangement 2. A common port of the combiner could be connected to the central port of the respective phase shifter arrangement 103. The TX-port and the RX-port could then be connected to the respective power amplifier or low noise amplifier in the active antenna scenario. A radome 106 closes the mobile communication antenna 100.

The combiner 105 and the respective phase shifter arrangement 103 for each of polarizations of the dual-polarized radiator arrangements 1 could be integrated in the same housing. The housing floor divides the receiving rooms for the combiner 105 and the phase shifter arrangement 103, wherein an opening between the housing floor is used to connect the common port of the combiner 105 to the respective phase shifter arrangement 103. The housing is preferably made of metal, more preferably sheetmetal or die-cast aluminium.

Figure 2A:
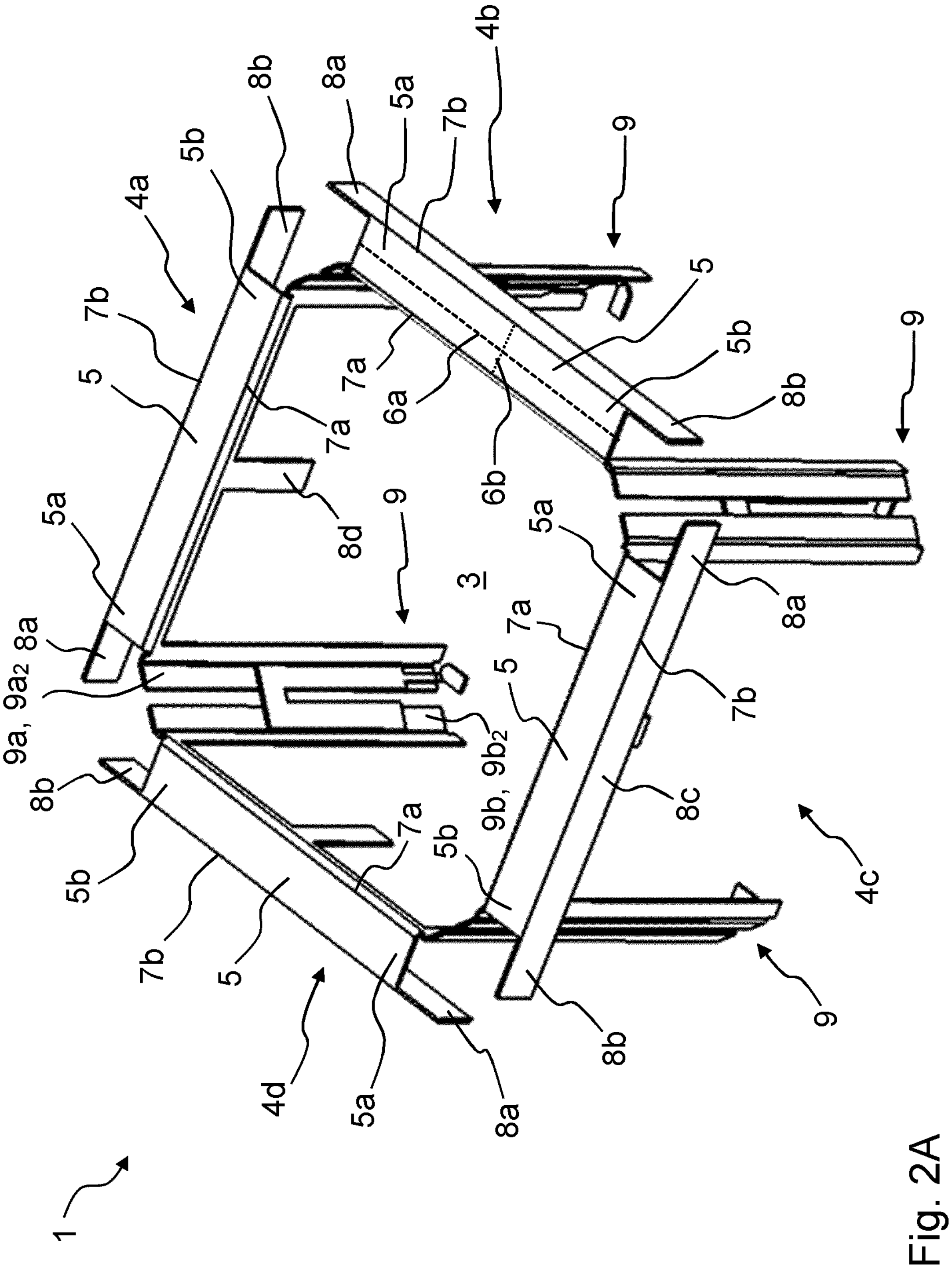
FIGS. 2A, 2B: different views of the dual-polarized radiator arrangement according to the present invention.
Figure 2B:
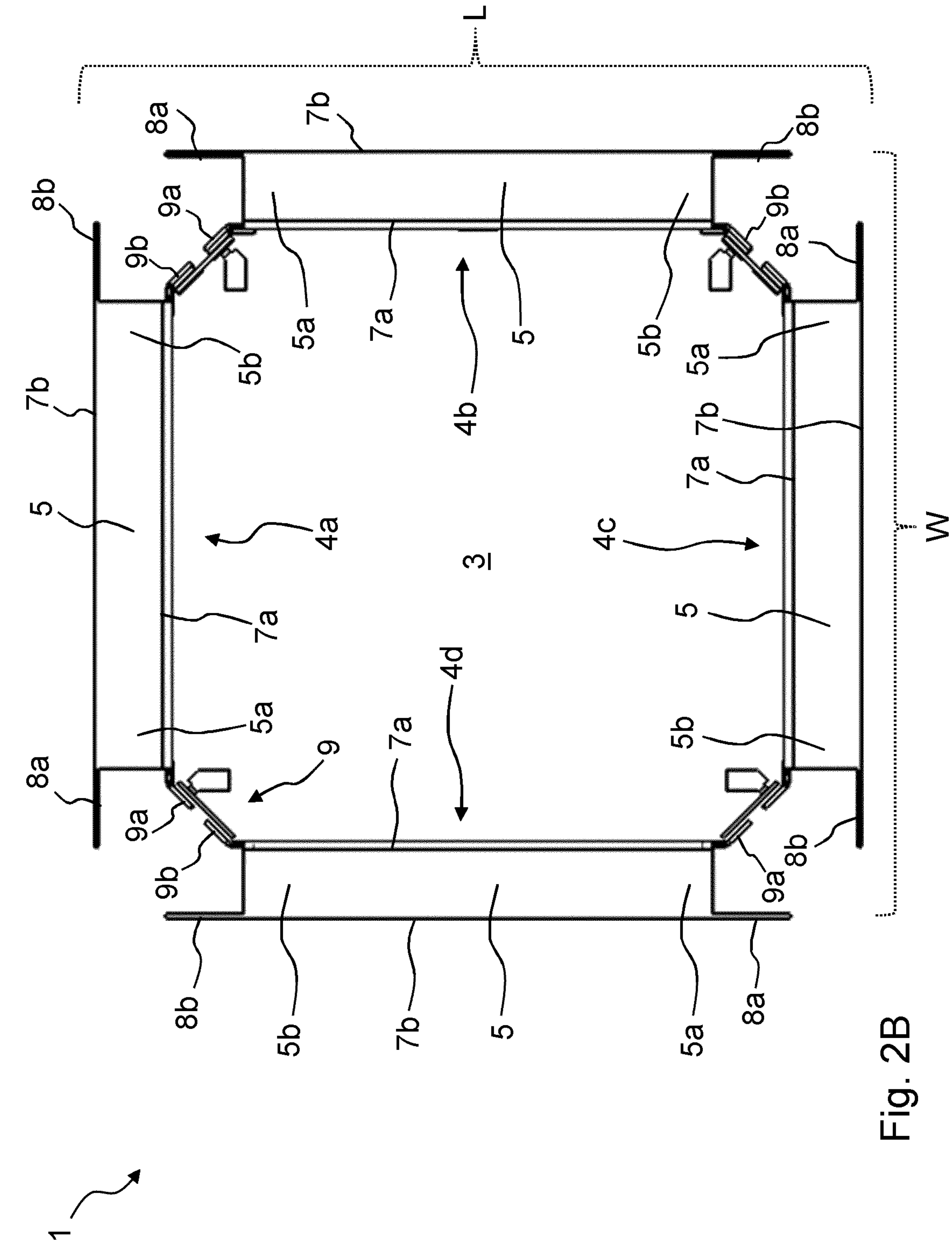

FIGS. 2A, 2B show different views of the dual-polarized radiator arrangement 1 according to the present invention. The dual-polarized radiator arrangement 1 comprises four radiator segments 4*a*, 4*b*, 4*c*, 4*d* which are arranged on the reflector arrangement 2. Each radiator segment 4*a*, 4*b*, 4*c*, 4*d* is arranged at a rotation relative to its two neighboring radiator segments 4*a*, 4*b*, 4*c*, 4*d*. In that case, the four radiator segments 4*a*, 4*b*, 4*c*, 4*d* form a square arrangement and enclose the receiving area 3. Each radiator segment 4*a*, 4*b*, 4*c*, 4*d* comprises a minor radiating surface 5 having a first end 5*a* and the second end 5*b*. The minor radiating surface 5 is arranged substantially parallel to and spaced apart from the reflector arrangement 2.

The minor radiating surface 5 of each radiator segment 4*a*, 4*b*, 4*c*, 4*d* extends in the longitudinal direction 6*a* and in the transverse direction 6*b*. The extension in the longitudinal direction 6*a* is larger than the extension in the transverse direction 6*b*. Each radiator segment 4*a*, 4*b*, 4*c*, 4*d* comprises a feeding assembly 9.

Each radiator segment 4*a*, 4*b*, 4*c*, 4*d* comprises a first main radiating surface 8*a* and a second main radiating surface 8*b*. The first main radiating surface 8*a* is arranged in the area of the first end 5*a* of the minor radiating surface 5 and runs in the direction of the reflector arrangement 2. The second main radiating surface 8*b* is arranged in the area of the second end 5*b* of the minor radiating surface 5 and runs in the direction of the reflector arrangement 2.

The first main radiating surface 8*a* protrudes beyond the first end 5*a* of the minor radiating surface 5 in the longitudinal direction 6*a* of the minor radiating surface 5. The second main radiating surface 8*b* protrudes beyond the second end 5*b* of the minor radiating surface 5 in the longitudinal direction 6*a* of the minor radiating surface 5.

As can be seen, the first main radiating surface 8*a* of each of the radiator segments 4*a*, 4*b*, 4*c*, 4*d* forms an angle of approximately 90° to the adjacent second main radiating surface 8*b* of the respective adjacent radiator segment 4*a*, 4*b*, 4*c*, 4*d*.

Preferably, the first and the second main radiating surfaces 8*a*, 8*b* are only connected to the respective minor radiating surface 5. The first and the second main radiating surfaces 8*a*, 8*b* are further preferably free of any cable and/or solder joints.

The first and the second main radiating surfaces 8*a*, 8*b* are arranged substantially in the vertical plane. The first and the second main radiating surfaces 8*a*, 8*b* thereby form an angle of approximately 90° to the reflector arrangement 2.

Preferably, the first and the second main radiating surfaces 8*a*, 8*b* only extend in a plane which is arranged vertically to the reflector arrangement 2 and not horizontally.

Preferably, the shortest distance between one main radiating surface 8*a* and one main radiating surface 8*b* is orthogonal to one co-polarization vector in mainbeam direction and parallel to the other co-polarization vector in mainbeam direction.

Preferably, the mainbeam direction is the direction with the highest directivity and more preferably the mainbeam is orthogonal to the reflector arrangement 2.

Preferably, the minor radiating surface 5 only extends in a plane which is arranged horizontally to the reflector arrangement 2 and not vertically.

Preferably, the minor radiating surface 5 extends mainly parallel to the reflector arrangement 2 and in an angle of around 45° or 135° to the co polarization vector in mainbeam direction.

The wording around comprises deviations of preferably less than 15°, 10°, 5° or less than 5°.

An angle between the first and the second main radiating surfaces 8*a*, 8*b* and the respective minor radiating surface 5 is approximately 90°.

Preferably the first main radiating surface 8*a* protrudes the first end 5*a* of the minor radiating surface 5 by the same length as the second main radiating surface 8*b* protrudes the second end 5*b* of the minor radiating surface 5.

The respective first and second main radiating surfaces 8*a*, 8*b* end at a distance spaced apart from the neighboring respective second and first main radiating surfaces 8*b*, 8*a* of the adjacent radiator segment 4*a*, 4*b*, 4*c*, 4*d*.

Each of the four radiator segments 4*a*, 4*b*, 4*c*, 4*d* is preferably made of a metal single piece. It could also be possible that all of the four radiator segments 4*a*, 4*b*, 4*c*, 4*d* are made of a common single metal piece.

The respective first and second main radiating surfaces 8*a*, 8*b* preferably protrudes the respective first and second end 5*a*, 5*b* of the minor radiating surface by more than 5 mm, 10 mm, 15 mm, 20 mm, 25 mm, 30 mm, 35 mm, 40 mm, 45 mm or by more than 50 mm.

The respective first and second main radiating surfaces 8*a*, 8*b* preferably protrude the respective first and second end 5*a*, 5*b* of the minor radiating surface by more than 0,025*X or 0.05*X or 0.1*X or 0.15*X or 0.2*X or 0.25*X or or by more than 0.35*X. With X being L or W.

The first and second main radiating surfaces 8*a*, 8*b* run towards the reflector arrangement 2 to by more than 5 mm, 10 mm, 15 mm, 20 mm, 25 mm, 30 mm, 35 mm, 40 mm, 45 mm or by more than 50 mm. However, the first and second main radiating surfaces 8*a*, 8*b* end at a distance spaced apart from the reflector arrangement 2. Preferably, the first and second main radiating surfaces 8*a*, 8*b* end at a distance which is larger than 5 mm, 10 mm, 15 mm, 20 mm, 25 mm, 30 mm, 35 mm, 40 mm, 45 mm or larger than 50 mm.

The first and second main radiating surfaces 8*a*, 8*b* run towards the reflector arrangement 2 by more than 0,025*X or 0.05*X or 0.1*X or 0.15*X or 0.2*X or 0.25*X or 0.3*X or by more than 0.35*X. However, the first and second main radiating surfaces 8*a*, 8*b* end at a distance spaced apart from the reflector arrangement 2. Preferably, the first and second main radiating surfaces 8*a*, 8*b* end at a distance which is larger than 0,025*X or 0.05*X or 0.1*X or 0.15*X or 0.2*X or 0.25*X or 0.3*X or larger than 0.35*X. With X being L or W.

Within FIG. 2A, the first and the second main radiating surfaces 8*a*, 8*b* are in the form of a single rectangular element. More precisely, the first and the second main radiating surfaces 8*a*, 8*b* are connected to each other via a connecting surface 8*c*. In that case, the connecting surface 8*c* has the same height in the direction towards the reflector arrangement 2 as the first and the second main radiating surfaces 8*a*, 8*b*. However, the connecting surface 8*c* could also have a smaller height or larger height than the first and the second radiating surfaces 8*a*, 8*b*.

Preferably one or all of the radiator segments 4*a*, 4*b*, 4*c*, 4*d* comprises symmetrical structure. The respective radiator segment 4*a*, 4*b*, 4*c*, 4*d* is preferably symmetrical to a plane which is perpendicular to the reflector arrangement 2. As such, the first main radiating surface 8*a* is mirror image (mirrored to) of the second main radiating surface 8*b*.

Furthermore, each minor radiating surface 5 of the four radiator segments 4*a*, 4*b*, 4*c*, 4*d* preferably comprises an inner edge 7*a* which runs in the longitudinal direction 6*a* of the minor radiating surface 5 and points towards the receiving area 3. Furthermore, each minor radiating surface 5 of the four radiator segments 4*a*, 4*b*, 4*c*, 4*d* preferably comprises an outer edge 7*b* which extends in the longitudinal direction 6*a* of the minor radiating surface 5 and which is spaced from the inner edge 7*a* in the transverse direction 6*b* of the minor radiating surface 5.

The feeding assembly 9 is preferably connected to and/or located at the inner edge 7*a* of the respective minor radiating surface 5. Contrary to that, the first main radiating surface 8*a* of each radiator segment 4*a*, 4*b*, 4*c*, 4*d* is preferably arranged (connected to and/or located) at the outer edge 7*b* of the respective minor radiating surface 5. The same could also be true for the second main radiating surface 8*b* of each of the radiator segments 4*a*, 4*b*, 4*c*, 4*d*. In that case, the second main radiating surface 8*b* would also be arranged at the outer edge 7*b* of the respective minor radiating surface 5.

FIG. 2B shows a top view of the dual-polarized radiator arrangement 1 of FIG. 2A according to the present invention.

The lowest used resonance frequency range is preferably 698-960 MHz.

The fractional bandwidth in percentage of the dual-polarized radiator arrangement 1 lowest used resonance frequency range is preferably larger than 20%, 25%, 30%, 35%, 40%, 45%, 50% or larger 50% with return loss better 6 dB, 10 dB, 12.5 dB, 15 dB.

The width W is preferably around 148 mm (~0.41λ at 829 MHz). The wording around comprises deviations of preferably less than 20%, 15%, 10% or less than 5%.

The width L is preferably around 148 mm (~0.41λ at 829 MHz). The wording around comprises deviations of preferably less than 20%, 15%, 10% or less than 5%.

The height is preferably around 96 mm. The wording around comprises deviations of preferably less than 20%, 15%, 10% or less than 5%.

Figure 3A:
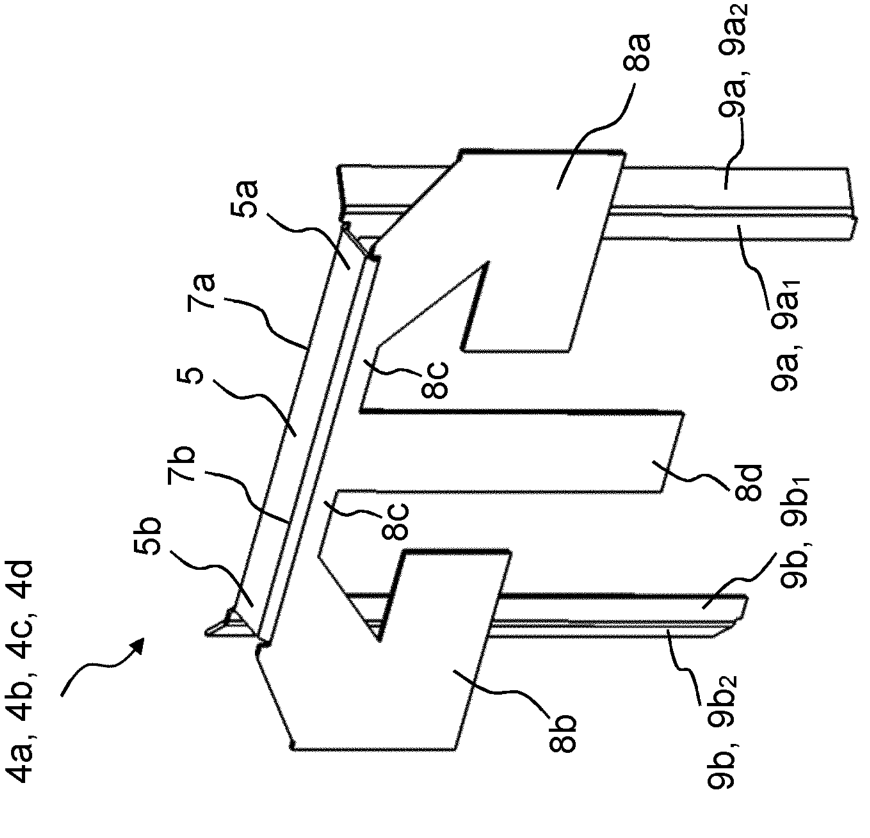
FIGS. 3A, 3B: different embodiments of a radiator segment of the dual-polarized radiator arrangement.
Figure 3B:
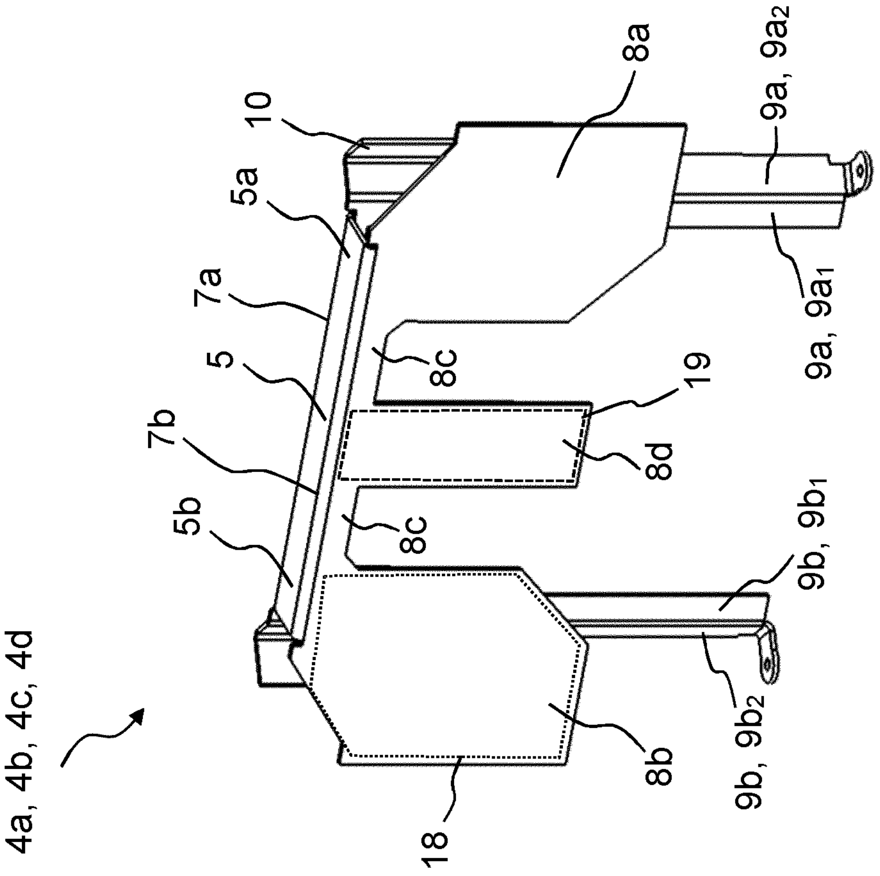

FIGS. 3A, 3B show different embodiments of a radiator segment 4*a*, 4*b*, 4*c*, 4*d* of the dual-polarized radiator arrangement 1. It can be seen, that each of the radiator segments 4*a*, 4*b*, 4*c*, 4*d* is symmetrical regarding a plane which is perpendicular to the reflector arrangement 2.

The width W in FIGS. 3A, 3B is preferably around 125 mm (~0.35λ→829 MHz). The wording around comprises deviations of preferably less than 20%, 15%, 10% or less than 5%.

The width L in FIGS. 3A, 3B is preferably around 125 mm (~0.35λ→829 MHz). The wording around comprises deviations of preferably less than 20%, 15%, 10% or less than 5%.

The height in FIGS. 3A, 3B is preferably around 96 mm (~0.265λ at 829 MHz) or 85 mm (~0.235λ at 829 MHz). The wording around comprises deviations of preferably less than 20%, 15%, 10% or less than 5%.

Within FIG. 3A, the first and the second main radiating surfaces 8*a*, 8*b* are L-shaped. Within FIG. 3B, the first and the second main radiating surfaces 8*a*, 8*b* are rectangular shaped. The first and the second main radiating surfaces 8*a*, 8*b* are both located at the outer edge 7*b* of the minor radiating surface 5.

Preferably, the first and the second main radiating surfaces 8*a*, 8*b* of one radiator segment 4*a*, 4*b*, 4*c*, 4*d* are also connected to each other. This is achieved by using the connecting surface 8*c*. The connecting surface is preferably also arranged at the outer edge 7*b* of the minor radiating surface 5 and extends at least in part towards the reflector arrangement 2.

FIGS. 3A, 3B show an auxiliary radiator surface 8*d* which could also be described as auxiliary radiator structure 8*d* or preferably as auxiliary radiator planar structure 8*d*. Preferably, such an auxiliary radiator surface 8*d* is located at each of the at least four radiator segments 4*a*, 4*b*, 4*c*, 4*d*. Preferably, there is only one auxiliary radiator surface 8*d* for each of the radiator segments 4*a*, 4*b*, 4*c*, 4*d*. However, it could also be that there is more than one auxiliary radiator surface 8*d* at each of the radiator segments 4*a*, 4*b*, 4*c*, 4*d*. It could also be, that the auxiliary radiator surface 8*d* is only located at two, preferably opposing radiator segments 4*a*, 4*c*; 4*b*, 4*d*. The auxiliary radiator surface 8*d* is arranged at the minor radiating surface 5 between the first and the second main radiating surfaces 8*a*, 8*b*.

The auxiliary radiator surface 8*d* extends in the direction of the reflector arrangement 2. The at least one auxiliary radiator surface 8*d* preferably extends further in the direction of the reflector arrangement 2 than the first and second main radiating surfaces 8*a*, 8*b* of the respective radiator segments 4*a*, 4*b*, 4*c*, 4*d*. However, this does not necessarily have to be the case. It could also be, that the at least one auxiliary radiator surface 8*d* extends over the same length towards the reflector arrangement 2 than the first and the second main radiating surfaces 8*a*, 8*b*. It could also be that the auxiliary radiator surface 8*d* extends less far in the direction of the reflector arrangement 2 than the first and the second main radiating surfaces 8*a*, 8*b*.

The at least one auxiliary radiator surface 8*d* is preferably inclined (bent) towards the direction of the receiving area 3. This enhances the radiation properties of the at least one dual-polarized radiator system 101 which might be placed within the receiving area 3.

The at least one auxiliary radiator surface 8*d* is preferably arranged at the inner edge 7*a* of the minor radiating surface

5 of the respective radiator segment 4$a$, 4$b$, 4$c$, 4$d$. However, the at least one axillary radiator surface 8$d$ could also be arranged at the outer edge 7$b$ of the minor radiating surface 5 of the respective radiator segment 4$a$, 4$b$, 4$c$, 4$d$. In that case, the auxiliary radiator surface 8$d$ (if not bent) lies preferably in the same plane as the first and the second main radiating surfaces 8$a$, 8$b$.

The respective radiator segment 4$a$, 4$b$, 4$c$, 4$d$ is preferably made of a single metal piece comprising the minor radiating surface 5, the first and the second radiating surfaces 8$a$, 8$b$, the optional at least one auxiliary radiator surface 8$d$ and the feeding assembly 9.

The dotted line 18 marking the boundary of the respective first or second main radiating surfaces 8$a$, 8$b$ has a length of approximately 0.28λ, wherein λ is the wavelength of the mid-frequency of the dual-polarized radiator arrangement 1. The wording approximately comprises deviations of preferably less than 20%, 15%, 10% or less than 5%.

The dashed line 19 marking the boundary of the respective auxiliary radiator surface 8$d$ has a length of approximately 0.305λ, wherein λ is the wavelength of the mid-frequency of the dual-polarized radiator arrangement 1. The wording approximately comprises deviations of preferably less than 20%, 15%, 10% or less than 5%.

Figure 4A:
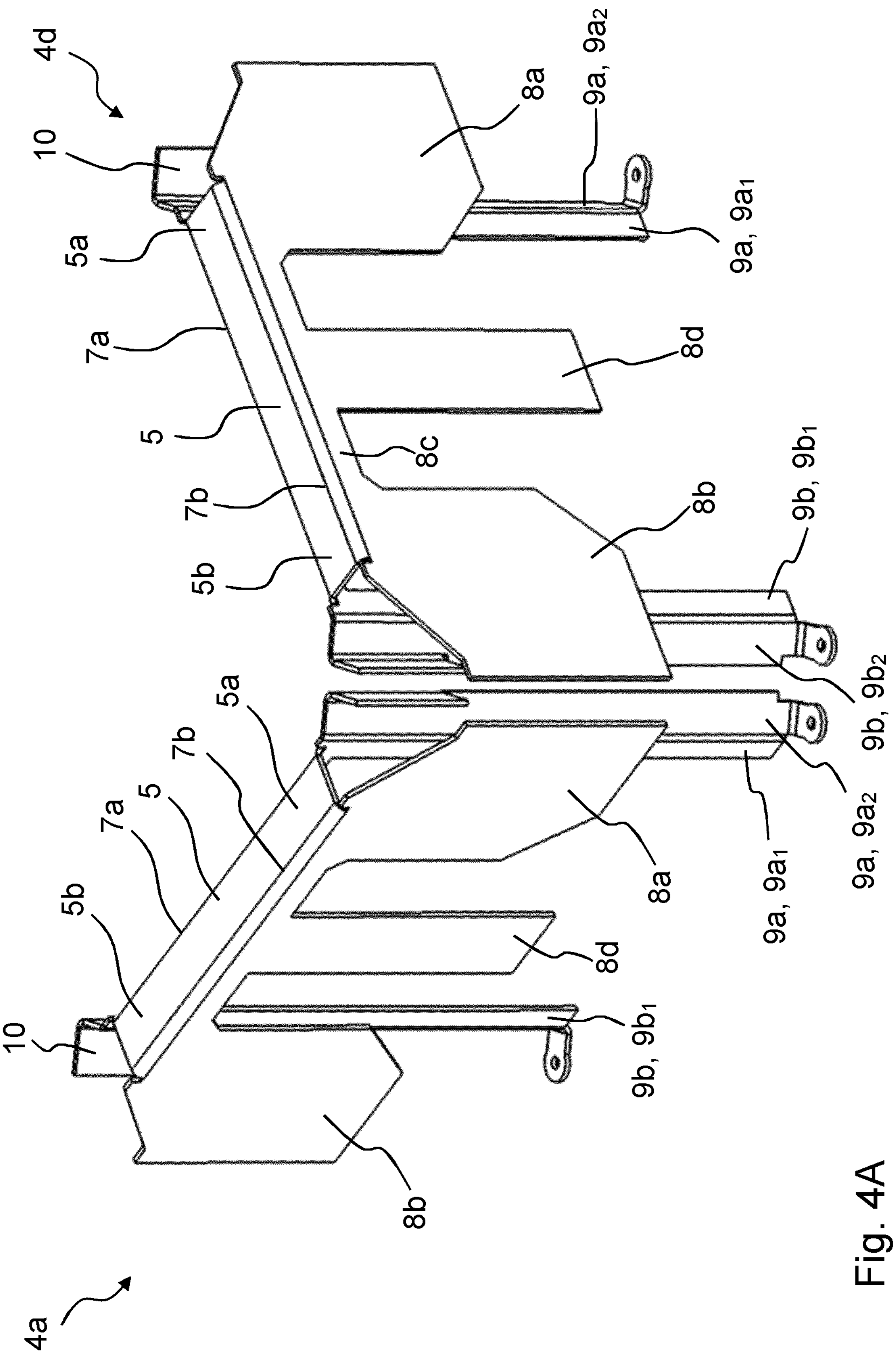
FIGS. 4A, 4B: different embodiments of two adjoining radiator segments of the dual-polarized radiator arrangement.
Figure 4B:
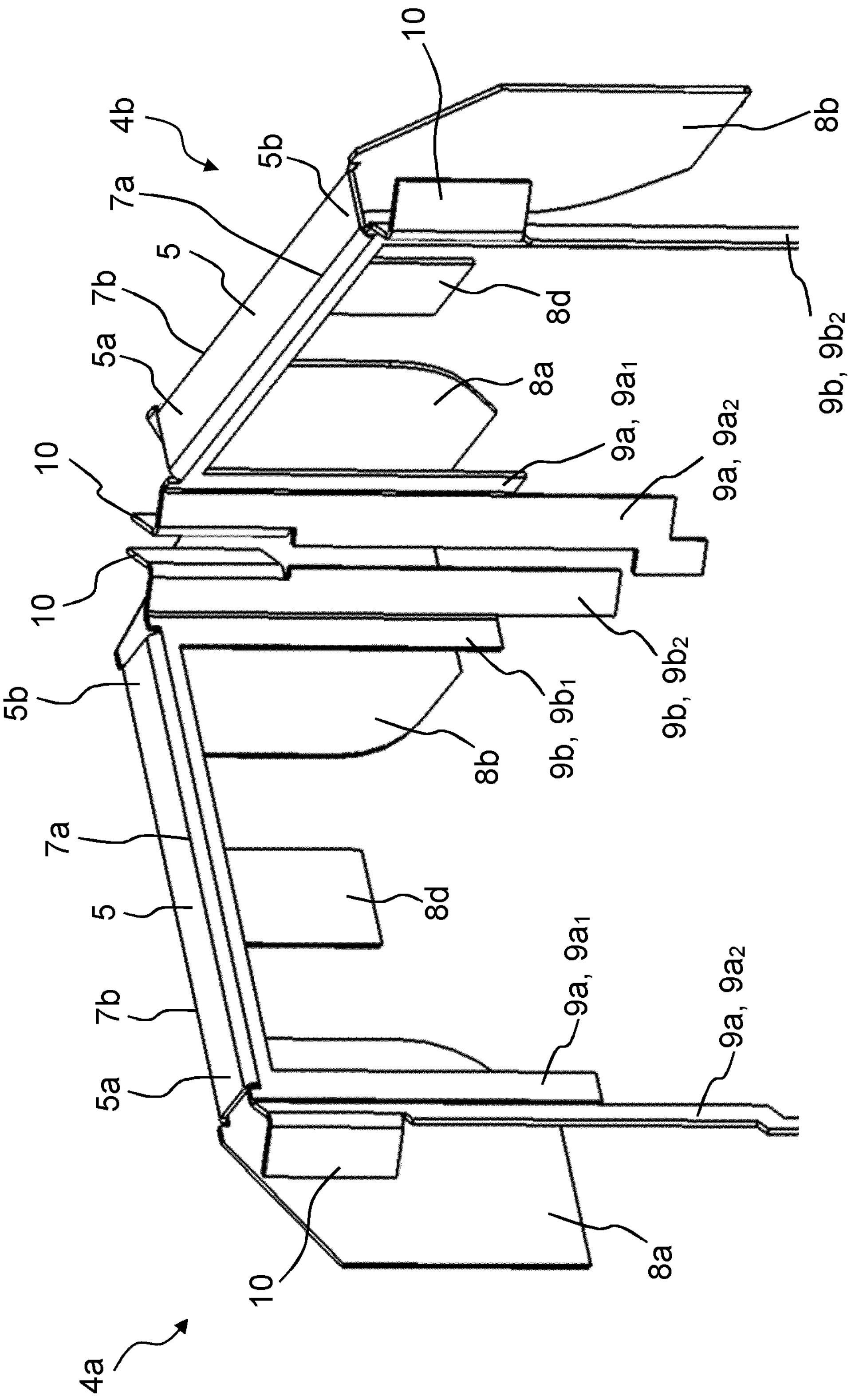

The following describes the feeding assembly 9 in more detail. Reference is made to FIGS. 4A and 4B. The feeding assembly 9 of each radiator segment 4$a$, 4$b$, 4$c$, 4$d$ comprises a first feed structure 9$a$ and a second feed structure 9$b$. The first feed structure 9$a$ extends from the region of the first end 5$a$ of the minor radiating surface 5 towards the reflector arrangement 2 and the second feed structure 9$b$ extends from the region of the second end 5$b$ of the minor radiating surface 5 towards the reflector arrangement 2. The first main radiating surface 8$a$ is spaced apart in the transverse direction 6$b$ of the minor radiating surface 5 from the first feed structure 9$a$. The first feed structure 9$a$ preferably extends further towards the reflector arrangement 2 than the first main radiating surface 8$a$. The first second radiating surface 8$b$ is spaced apart in the transverse direction 6$b$ of the minor radiating surface 5 from the second feed structure 9$b$. The second feed structure 9$b$ preferably extends further towards the reflector arrangement 2 than the second main radiating surface 8$b$.

The first feed structure 9$a$ of each radiator segment 4$a$, 4$b$, 4$c$, 4$d$ is bent in the direction of the nearest second feed structure 9$b$ of the respective adjacent radiator segment 4$a$, 4$b$, 4$c$, 4$d$. The second feed structure 9$b$ of each radiator segment 4$a$, 4$b$, 4$c$, 4$d$ is bent in the direction of the nearest first feed structure 9$a$ of the respective adjacent radiator segment 4$a$, 4$b$, 4$c$, 4$d$. The first and second feed structures 9$a$, 9$b$ of the respective adjacent radiator segments 4$a$, 4$b$, 4$c$, 4$d$ are bent towards each other but spaced apart and are aligned parallel to each other or run through the same plane.

Preferably, the first feed structure 9$a$ is bent by an angle of 45° towards the inner edge 7$a$ of the minor radiating surface 5. Preferably, the second feed structure 9$b$ is bent by an angle of 45° towards the inner edge 7$a$ of the minor radiating surface 5.

More preferably, the first feed structure 9$a$ comprises two substructures 9$a_1$, 9$a_2$, wherein the first substructure 9$a_1$ preferably runs parallel to the inner edge 7$a$ of the minor radiating surface 5, and wherein the second substructure 9$a_2$ forms an angle of approximately 45° towards the first substructure 9$a_1$ and towards the inner edge 7$a$ of the minor radiating surface 5.

In addition, the second feed structure 9$b$ comprises two substructures 9$b_1$, 9$b_2$, wherein the first substructure 9$b_1$ preferably runs parallel to the inner edge 7$a$ of the minor radiating surface 5, and wherein the second substructure 9$b_2$ forms an angle of approximately 45° towards the first substructure 9$b_1$ and towards the inner edge 7$a$ of the minor radiating surface 5.

Preferably, the first feed structure 9$a$ protrudes from the first end 5$a$ of the minor radiating surface 5 in the longitudinal direction 6$a$ of the first minor radiating surface 5. More preferably, the second feed structure 9$b$ protrudes from the second end 5$b$ of the minor radiating surface 5 in the longitudinal direction 6$a$ of the first minor radiating surface 5. More preferably, this is true for at least the second substructures 9$a_2$, 9$b_2$ of the first and second feed structures 9$a$, 9$b$. However, this could also be true for the first substructures 9$a_1$, 9$b_1$.

Preferably, the second substructures 9$a_2$, 9$b_2$ extend further towards the reflector arrangement 2 than the first substructures 9$a_1$, 9$b_1$. However, both, the first and the second substructures 9$a_1$, 9$a_2$; 9$b_1$, 9$b_2$ of the first and second feed structures 9$a$, 9$b$ could also extend towards the reflector arrangement 2 by the same length.

The second substructures 9$a_2$, 9$b_2$ of the first and second feed structures 9$a$, 9$b$ could also comprise a zigzag-shape, for example at the bottom part arranged closely to the reflector arrangement 2.

The second substructures 9$a_2$, 9$b_2$ are preferably wider than the first substructures 9$a_1$, 9$b_1$.

At least the second substructure 9$a_2$ of the first feed structure 9$a$ of the respective radiator segment 4$a$, 4$b$, 4$c$, 4$d$ runs parallel or is aligned in the same plane compared to the nearest second substructure 9$b_2$ of the second feed structure 9$b$ of the respective adjacent radiator segment 4$a$, 4$b$, 4$c$, 4$d$. However, the neighboring second substructures 9$b_2$ of two radiator segments 4$a$, 4$b$, 4$c$, 4$d$ are spaced apart thereby forming a gap between them.

The first feed structure 9$a$ and/or the second feed structure 9$b$ could be galvanically connected to the reflector arrangement 2. Instead of a galvanic connection, a capacitive connection could also be possible. Preferably only one of the two adjacent first and second feed structures 9$a$, 9$b$ of two adjacent radiator segments 4$a$, 4$b$, 4$c$, 4$d$ is galvanically and/or capacitively connected to the reflector arrangement 2. In order to achieve a galvanic connection, the base portion of the respective first and/or second feed structure 9$a$, 9$b$ could be inserted through an opening in the reflector arrangement 2 and soldered to the first side and/or second side of the reflector arrangement 2. Alternatively, the base portion of the respective first and/or second feed structure 9$a$, 9$b$ could also be bent by an angle of approximately 90° so that the base portion runs substantially parallel to the reflector arrangement 2. This is shown within FIG. 4$a$. This base portion could then be solders to the reflector arrangement. Using a bent base portion, no openings are required in the reflector arrangement 2 for fixing the radiator segments 4$a$, 4$b$, 4$c$, 4$d$. It could also be that the base portion of two adjacent first and second feed structures 9$a$, 9$b$ of adjacent radiator segments 4$a$, 4$b$, 4$c$, 4$d$ are bent towards each other and overlapping each other. Those base portions are then galvanically connected to each other, for example by applying a solder joint.

The galvanic connection is preferably applied at the respective second substructure 9$a_2$, 9$b_2$ of the respective first and/or second feed structure 9$a$, 9$b$.

The first feed structure 9$a$ and/the second feed structure 9$b$ of the respective radiator segment 4$a$, 4$b$, 4$c$, 4$d$ could be galvanically connected to the reflector arrangement 2 or capacitively coupled to the reflector arrangement 2 or end at a distance from the reflector arrangement 2.

It can also be seen that the first and second feed structures 9*a*, 9*b* of at least two adjacent radiator segments 4*a*, 4*b*, 4*c*, 4*d* comprise coupling surfaces 10.

Preferably each radiator segment 4*a*, 4*b*, 4*c*, 4*d* comprises one coupling surface 10 at the respective first and second feed structures 9*a*, 9*b*. The coupling surface 10 could also be described as coupling structure or coupling planar structure. The coupling surface 10 of first and second neighboring feed structures 9*a*, 9*b* of adjacent radiator segments 4*a*, 4*b*, 4*c*, 4*d* are aligned parallel to each other and facing each other resulting in a capacitive coupling. Preferably, the respective coupling surfaces 10 are bent by approximately 90° away from the remaining first and second feed structures 9*a*, 9*b*. More preferably, the coupling surfaces 10 are bent by approximately 90° away from the second substructure $9a_2$, $9b_2$ of the respective first and second feed structure 9*a*, 9*b*.

The coupling surfaces 10 are preferably arranged on the upper end of the respective first and second feed structures 9*a*, 9*b*. Preferably, the coupling surfaces 10 extend over a length of approximately more than 5 mm, 10 mm, 15 mm, 20 mm, 25 mm or more than 30 mm but preferably of less than 40 mm, 35 mm, 30 mm, 25 mm, 20 mm 15 mm or less than 10 mm. The coupling surfaces 10 are preferably bent outwards. That means, that they are not bent towards receiving area 3 of the dual-polarized radiator arrangement 1. Between two facing neighboring coupling surfaces 10 a capacitive area is provided for impedance matching and/or for electrical length extension. By inserting additional materials, like dielectrics into the capacitive coupling area, the coupling between two coupling surfaces 10 can be adjusted/enhanced.

Figure 5:
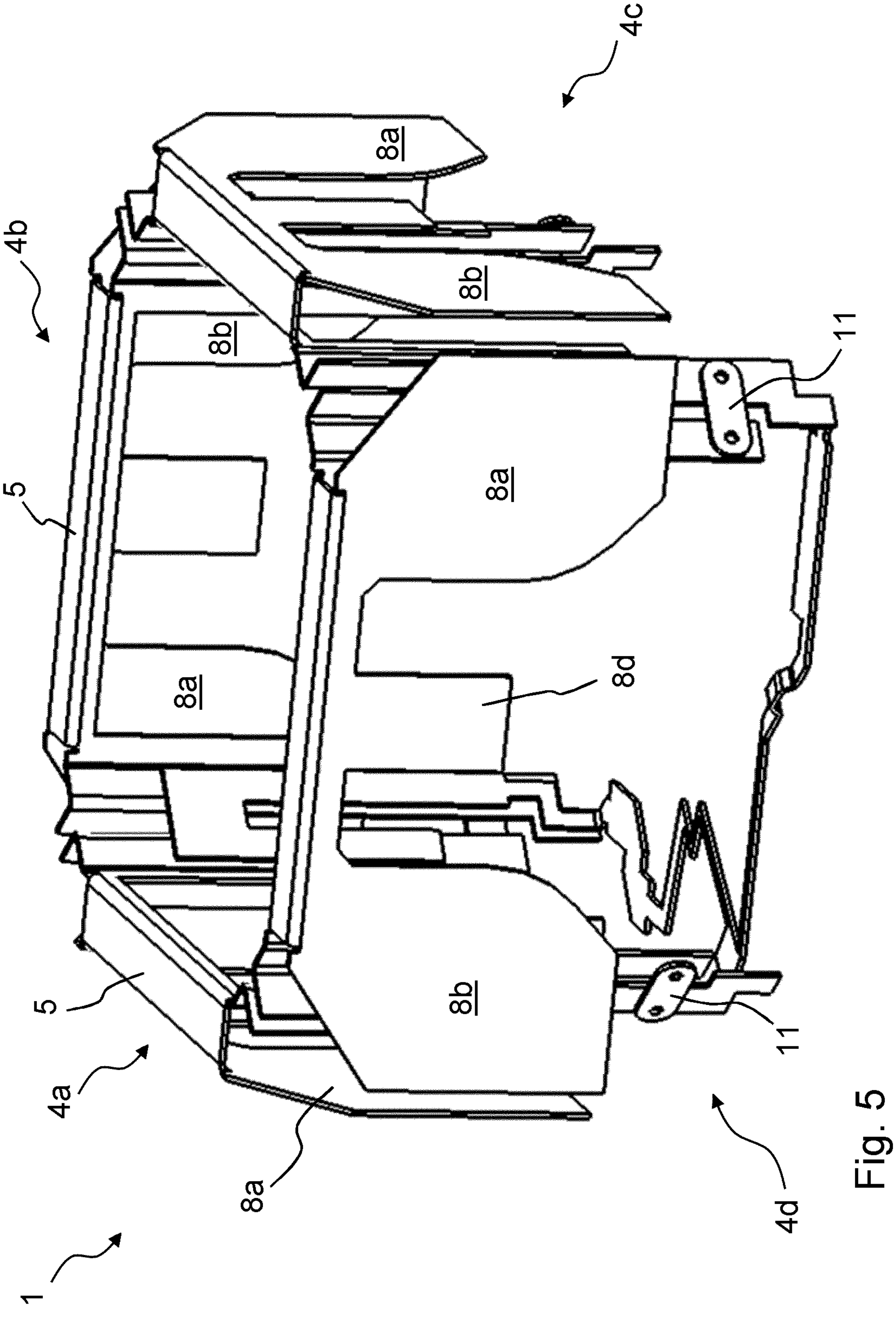
FIG. 5: another embodiment of the dual-polarized radiator arrangement according to the present invention.

Now referring to FIG. 5, it is shown that adjacent first and second feed structures 9*a*, 9*b* could optionally also be electrically connected to each other by using a coupling element 11. The coupling element 11 is electrically conductive. This coupling element 11 could be soldered to the respective adjacent first and second feed structures 9*a*, 9*b*. In that case, an electrical connection in the form of a galvanic connection is achieved. Instead of a galvanic connection, this coupling element 11 could also be placed at a distance from the first and the second feed structures 9*a*, 9*b* thereby establishing a capacitive coupling. Preferably, a dielectric, like a foil could be placed between the first and the second feed structures 9*a*, 9*b* and the coupling element 11. Preferably, the coupling element 11 is arranged in the end region of one or both of the first and the second feed structures 9*a*, 9*b*. More preferably, the coupling element 11 is arranged closer to the reflector arrangement 2 than the adjacent first and second main radiating surfaces 8*a*, 8*b*. More preferably, such a coupling element 11 is arranged at all first and second feed structures 9*a*, 9*b* of all radiator segments 4*a*, 4*b*, 4*c*, 4*d*. More preferably, the coupling element 11 is arranged at the second substructures $9a_2$, $9b_2$ of the respective first and second feed structure 9*a*, 9*b*.

Figure 6C:
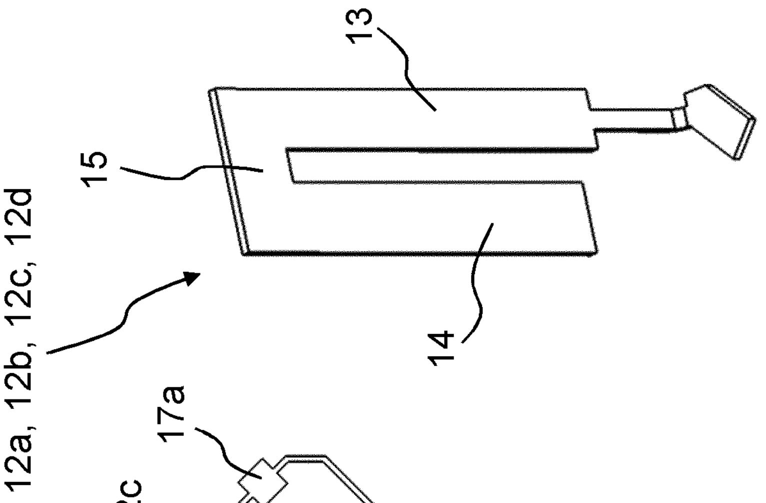
FIGS. 6A, 6B, 6C: different embodiments of four feed systems.
Figure 6B:
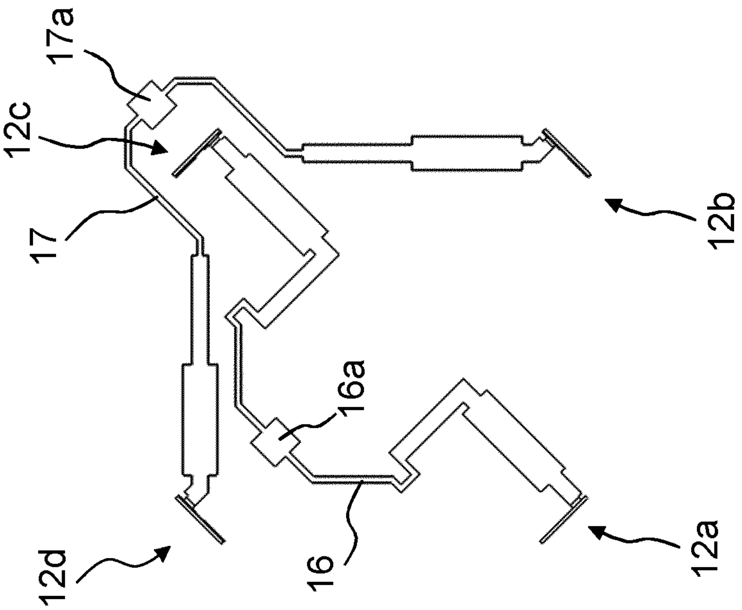
Figure 6A:
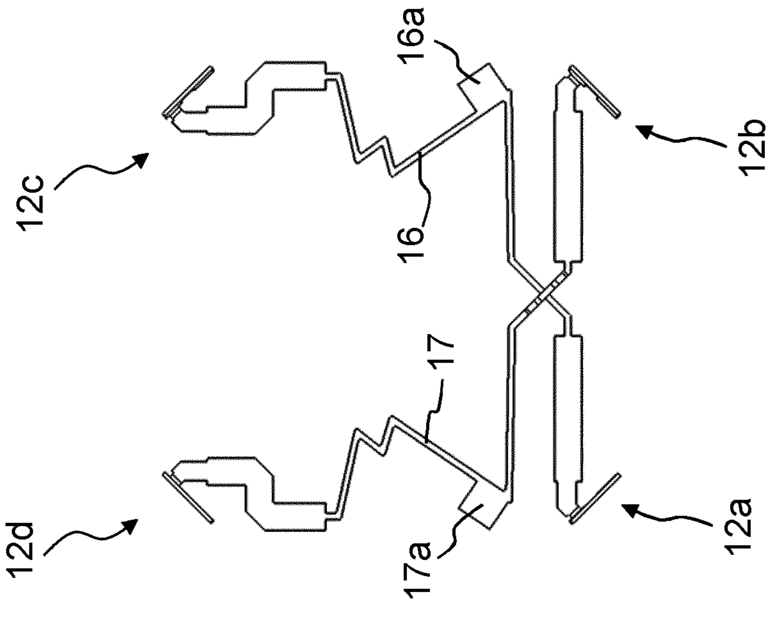

Referring now to FIGS. 6A, 6B, 6C four feeding systems 12*a*, 12*b*, 12*c*, 12*d* are shown. Each feeding system 12*a*, 12*b*, 12*c*, 12*d* comprises a first feed section 13 and a second feed section 14. The second feed section 14 is galvanically connected to the first feed section 13 at a connection area 15. As can be seen from FIG. 6*c*, the first and the second feed section 13, 14 are U-shaped. The first and the second feed section 13, 14 are preferably arranged in the same plane.

The electrical overall length of the feed system sections 13, 14 and 15 is preferably around 0.25*λ, considering a dielectric carrier for the feed system fixation or length reduction.

The part of the first feed section 13 running perpendicular to the reflector arrangement has therefore preferably a length of around 0.25*λ, wherein λ is the wavelength of the mid-frequency of the dual-polarized radiator arrangement 1.

The second feed section 14 could also be described as a stub. The feed section 14 is recommended for wideband matching but not necessarily required.

Each feed system 12*a*, 12*b*, 12*c*, 12*d* is arranged parallel to and facing one first feed structure 9*a* of the respective radiator segment 4*a*, 4*b*, 4*c*, 4*d* and parallel to and facing the nearest second feed structure 9*b* of the radiator segment 4*a*, 4*b*, 4*c*, 4*d* adjacent to the respective radiator segment 4*a*, 4*b*, 4*c*, 4*d* with the first feed structure 9*a*. As a result, a microstripline or airstripline balun is formed, depending on dielectric carrier for the feed system.

The first feed section 13 of the first feed system 12*a* is preferably connected to a transmitter and/or a receiver. More preferably, the first feed section 13 of the first feed system 12*a* is connected to a RF-matching and RF-distribution network, including transmission line based matching elements, phase shifters and power dividers.

The first feed section 13 of the second feed system 12*b* is preferably connected to a transmitter and/or a receiver. More preferably, the first feed section 13 of the second feed system 12*b* is connected to a RF-matching and RF-distribution network, including transmission line based matching elements, phase shifters and power dividers.

The first feed section 13 of the third feed system 12*c* is preferably connected to a transmitter and/or a receiver. More preferably, the first feed section 13 of the third feed system 12*c* is connected to a RF-matching and RF-distribution network, including transmission line based matching elements, phase shifters and power dividers.

The first feed section 13 of the fourth feed system 12*d* is preferably connected to a transmitter and/or a receiver. More preferably, the first feed section 13 of the fourth feed system 12*d* is connected to a RF-matching and RF-distribution network, including transmission line based matching elements, phase shifters and power dividers.

More preferably, the first feed section 13 of the first feed system 12*a* is electrically connected to the first feed section 13 of the third feed system 12*c*. More preferably, the first feed section 13 of the second feed system 12*b* is electrically connected to the first feed section 13 of the fourth feed system 12*d*.

The connecting line 16 between the first feed section 13 of the first feed system 12*a* and the first feed section 13 of the third feeding system 12*c* preferably comprises thicker segments followed by thinner segments thereby creating a matching network. The connecting line 17 between the first feed section 13 of the second feed system 12*b* and the first feed section 13 of the fourth feeding system 12*d* preferably comprises thicker segments followed by thinner segments thereby creating a matching network. The respective connecting line 16, 17 comprises a connection port 16*a*, 17*a* which is connected to the transmiller and/or receiver and especially to a second RF-matching and RF-distribution network and/or to another dual-polarized radiator arrangement 1, and/or to a multi-port phaseshifter and/or to a filter and/or to a diplexer and/or a transmitter and/or a receiver. The respective connection port 16*a*, 17*a* could be arranged in the middle between the first feed sections 13 of the first and third feed systems 12*a*, 12*c* and/or between the first feed sections 13 of the second and fourth feed systems 12*b*, 12*d*. However, the respective connection port 16*a*, 17*a* could also be arranged closer to one of the first feed sections 13 of the respective first and third feed systems 12*a*, 12*c* and/or closer to one of the first feed sections 13 of the respective second and fourth feed systems 12*b*, 12*d*.

The connection lines 16 and 17 could cross each other without being galvanically connected to each other as shown in FIG. 6A. However, in that case, the connection lines 16 and 17 preferably move perpendicular to each other. As such, the coupling is minimized. Preferably, the connection lines 16, 17 are arranged in such a way on the reflector arrangement 2 that they are not overlapping each other. Such an embodiment is shown in FIG. 6B.

The first feed sections 13 of the first and third feeding systems 12*a*, 12*c* are configured to transmit and/or receive a mobile radio signal in a first polarization. Contrary to that, the first feed sections 13 of the second and fourth feeding systems 12*b*, 12*d* are configured to transmit and/or receive a mobile radio signal in a second polarization. Both polarizations are orthogonal to each other.

Referring again to FIG. 6C, it should be noted, that the first feed section 13 of each of the feed systems 12*a*, 12*b*, 12*c*, 12*d* should run along and thereby facing the respective feed structure 9*a*, 9*b* of the respective radiator segments 4*a*, 4*b*, 4*c*, 4*d* which is galvanically connected or capacitively coupled to the reflector arrangement 2. If the first feed structure 9*a* is galvanically connected or capacitively coupled to the reflector arrangement 2 then the first feed section 13 of the respective feeding system 12*a*, 12*b*, 12*c*, 12*d* should run parallel along the first feed structure 9*a*. If the second feed structure 9*b* is galvanically connected or capacitively coupled to the reflector arrangement 2 then the first feed section 13 of the respective feeding system 12*a*, 12*b*, 12*c*, 12*d* should run parallel along the second feed structure 9*b*. The respective other feed structure 9*b*, 9*a* can also be galvanically connected to the reflector arrangement 2 or capacitively coupled thereto. However, the respective other feed structure 9*b*, 9*a* should preferably end at a distance spaced apart from the reflector arrangement 2. Preferably, in each corner between two neighboring radiator segments 4*a*, 4*b*, 4*c*, 4*d* only one of the feed structures 9*a*, 9*b* is connected galvanically to the reflector arrangement 2 or capacitively coupled thereto.

The other feed structure 9*a*, 9*b* preferably ends at a distance from the reflector arrangement 2.

Within the embodiment of FIGS. 2A and 2B, the first feed section 13 of the first feeding system 12*a* is arranged next to the first feed structure 9*a* of the first radiator segment 4*a*. The second feed section 14 of the first feeding system 12*a* is arranged next to the second feed structure 9*b* of the fourth radiator segment 4*d*.

The first feed section 13 of the second feeding system 12*b* is arranged next to the first feed structure 9*a* of the second radiator segment 4*b*. The second feed section 14 of the second feeding system 12*b* is arranged next to the second feed structure 9*b* of the first radiator segment 4*a*.

The first feed section 13 of the second feeding system 12*b* is arranged next to the first feed structure 9*a* of the second radiator segment 4*b*. The second feed section 14 of the second feeding system 12*b* is arranged next to the second feed structure 9*b* of the first radiator segment 4*a*.

The first feed section 13 of the third feeding system 12*c* is arranged next to the second feed structure 9*b* of the second radiator segment 4*b*. The second feed section 14 of the third feeding system 12*c* is arranged next to the first feed structure 9*a* of the third radiator segment 4*c*.

The first feed section 13 of the fourth feeding system 12*d* is arranged next to the second feed structure 9*b* of the third radiator segment 4*c*. The second feed section 14 of the fourth feeding system 12*d* is arranged next to the first feed structure 9*a* of the fourth radiator segment 4*d*.

The distance between the first feed section 13 or second feed section 14 and the respective first and second feed structures 9*a*, 9*b* is preferably less than 5 mm, 4 mm, 3 mm, 2 mm, 1 mm but preferably larger than 0.5 mm. The first feed section 13 and the second feed section 14 are preferably only capacitively (and not galvanically, which is also possible) coupled to the respective first and second feed structures 9*a*, 9*b*.

Figure 7B:
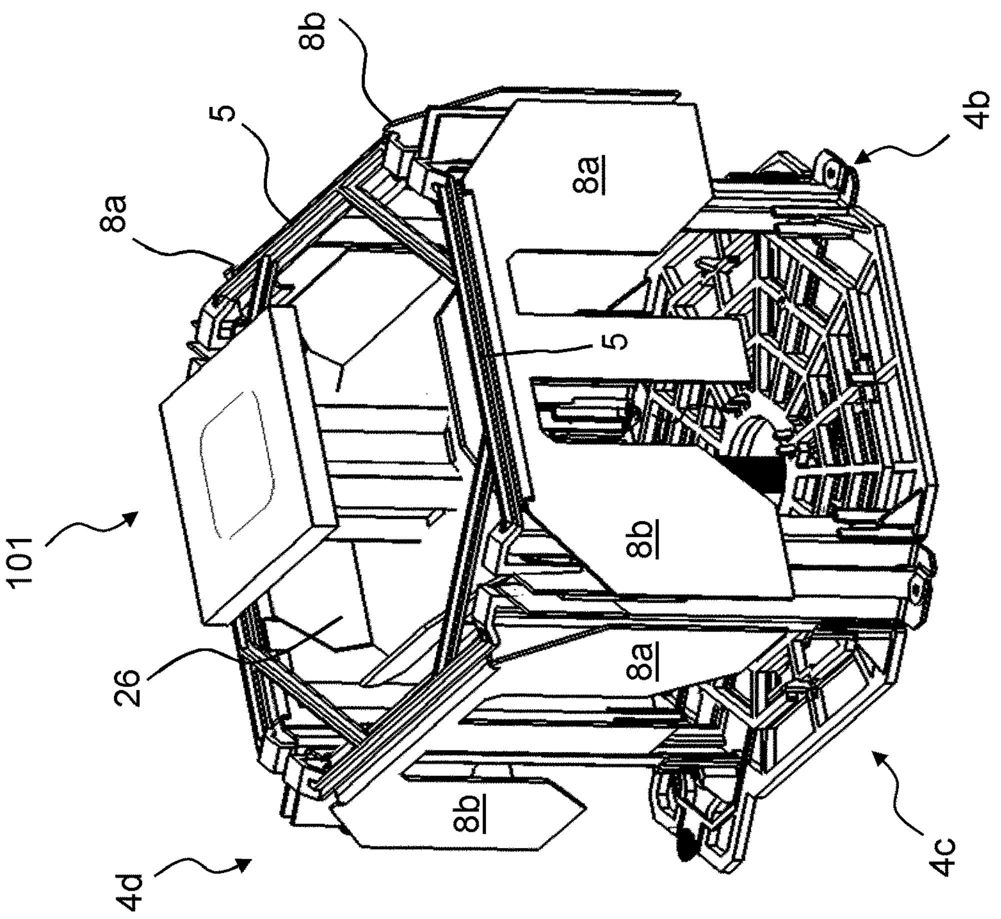
FIG. 7B: an embodiment of the at least one dual-polarized radiator arrangement and at least one dual-polarized radiator system comprising the holding device.
Figure 7A:
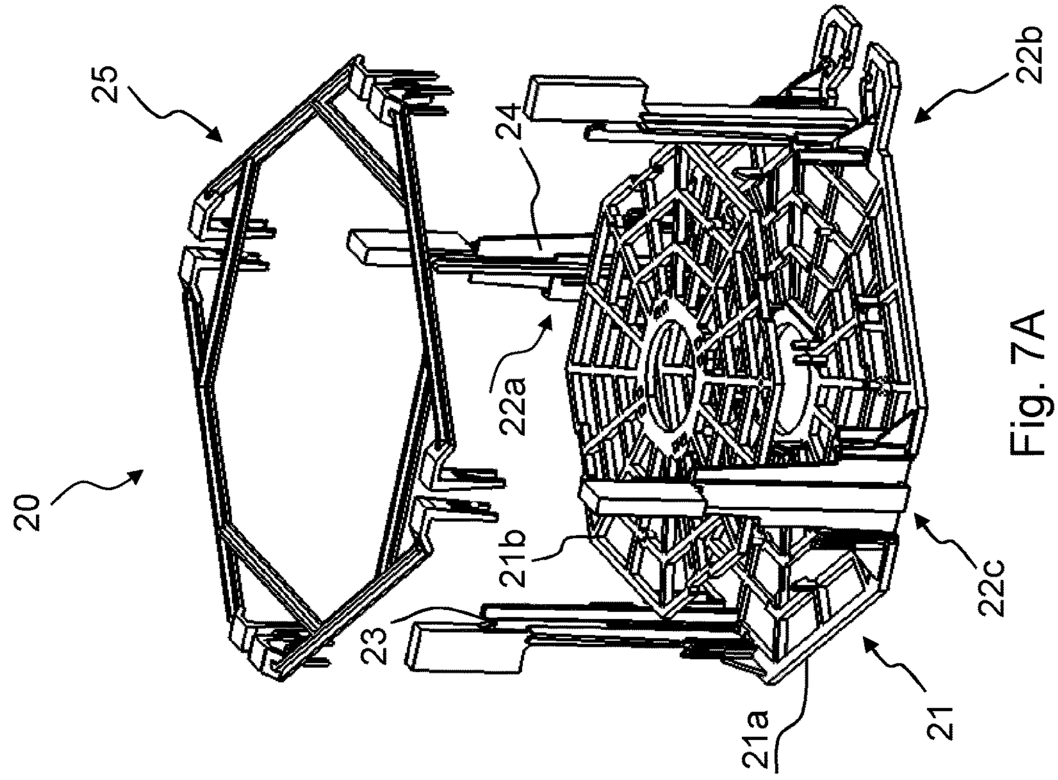
FIG. 7A: an embodiment of a holding device.

Referring now to FIGS. 7A, 7B a holding device 20 is shown. The holding device 20 comprises in that embodiment a base portion 21 and a top portion 25 and at least four holding arms 22*a*, 22*b*, 22*c*, 22*d*. The holding device 20 is configured to hold the radiator segments 4*a*, 4*b*, 4*c*, 4*d* in position. Each holding arm 22*a*, 22*b*, 22*c*, 22*d* extends from the base portion 21 and consists of or comprises a dielectric material. The dielectric material has a relative permittivity $\varepsilon_r$ of preferably more than 1. Preferably, the $\varepsilon_r$ is between 2 and 5 for the holding device 20. Each holding arm 22*a*, 22*b*, 22*c*, 22*d* is configured to engage in the respective capacitive coupling area between two adjacent coupling surfaces 10. The base portion 21 and the top portion 25 are preferably separate elements. However, they could also be made of a single piece.

The base portion 21 is preferably of a planar structure. More preferably, the base portion 21 comprises openings so that the material needed in the manufacturing process is reduced. The base portion 21 is partly in the form of a spider web, but regarding cost and producibility of the dielectric material other forms, especially without spider web structure thereby using more dielectric material concentrated under the connecting lines 16, 17 are thinkable. In the middle of the base portion 21 there is an opening for the at least one dual-polarized radiator system 101.

In one embodiment, the base portion 21 consists of two parts 21*a* and 21*b*, wherein the connecting lines 16 and 17 of the respective feed systems 12*a*, 12*b*, 12*c*, 12*d* are arranged in between. This way, a low loss air microstripline is formed. The two parts 21*a*, 21*b* are preferably pressed together. More preferably a snap-in connection is used.

In another preferred embodiment, the respective feed systems 12*a*, 12*b*, 12*c*, 12*d* and/or the connecting lines 16, 17 are a part of or are made as a printed circuit board (PCB) and the base portion 21 is made in a way to fixate one or more printed circuit boards with the metallization of the feed system 12*a*, 12*b*, 12*c*, 12*d* and/or the connecting lines 16, 17.

In another preferred embodiment, the base portion 21 and the feed system 12*a*, 12*b*, 12*c*, 12*d* and the connecting lines 16, 17 are made as one molded interconnect device (MID), with partial metallization on at least one side. In this embodiment, the base portion 21 is preferably made of a single piece and without the spider web. The dielectric material of the base portion 21 is concentrated under der connecting lines 16, 17 for cost reduction and producibility.

Basically, the holding device 20 can have any form and number of parts.

The dimensions of the least one dual-polarized radiator arrangement 1 in FIG. 7B are L=125 mm, W=125 mm and H=85 mm. The total height over the reflector arrangement 2 is 110 mm with the dual-polarized radiator system 101.

Within FIG. 7A it can be seen, that the respective holding arm 22*a*, 22*b*, 22*c*, 22*d* comprises a shoulder 23 on which the respective feeding system 12*a*, 12*b*, 12*c*, 12*d* rests upon. Especially the connection area 15 of each feeding system 12*a*, 12*b*, 12*c*, 12*d* lays upon the shoulder 23.

Furthermore, each holding aim comprises a spacing structure 24 extending from the base portion 21. The spacing structure 24 preferably extends vertically (perpendicular to the reflector arrangement 2). The spacing structure 24 lays between the respective first and second feed sections 13, 14 and the first and second feed structures 9*a*, 9*b* of the radiator segments 4*a*, 4*b*, 4*c*, 4*d*. As such, it is ensured that the first and second feed sections 13, 14 and first and second feed structures 9*a*, 9*b* of the radiator segments 4*a*, 4*b*, 4*c*, 4*d* do not contact each other galvanically.

Each holding arm 22*a*, 22*b*, 22*c*, 22*d* does preferably not protrude beyond the height of the minor radiating surface 5. The holding device 20 is preferably clipped in an opening in the reflector arrangement 2.

Figure 8A:
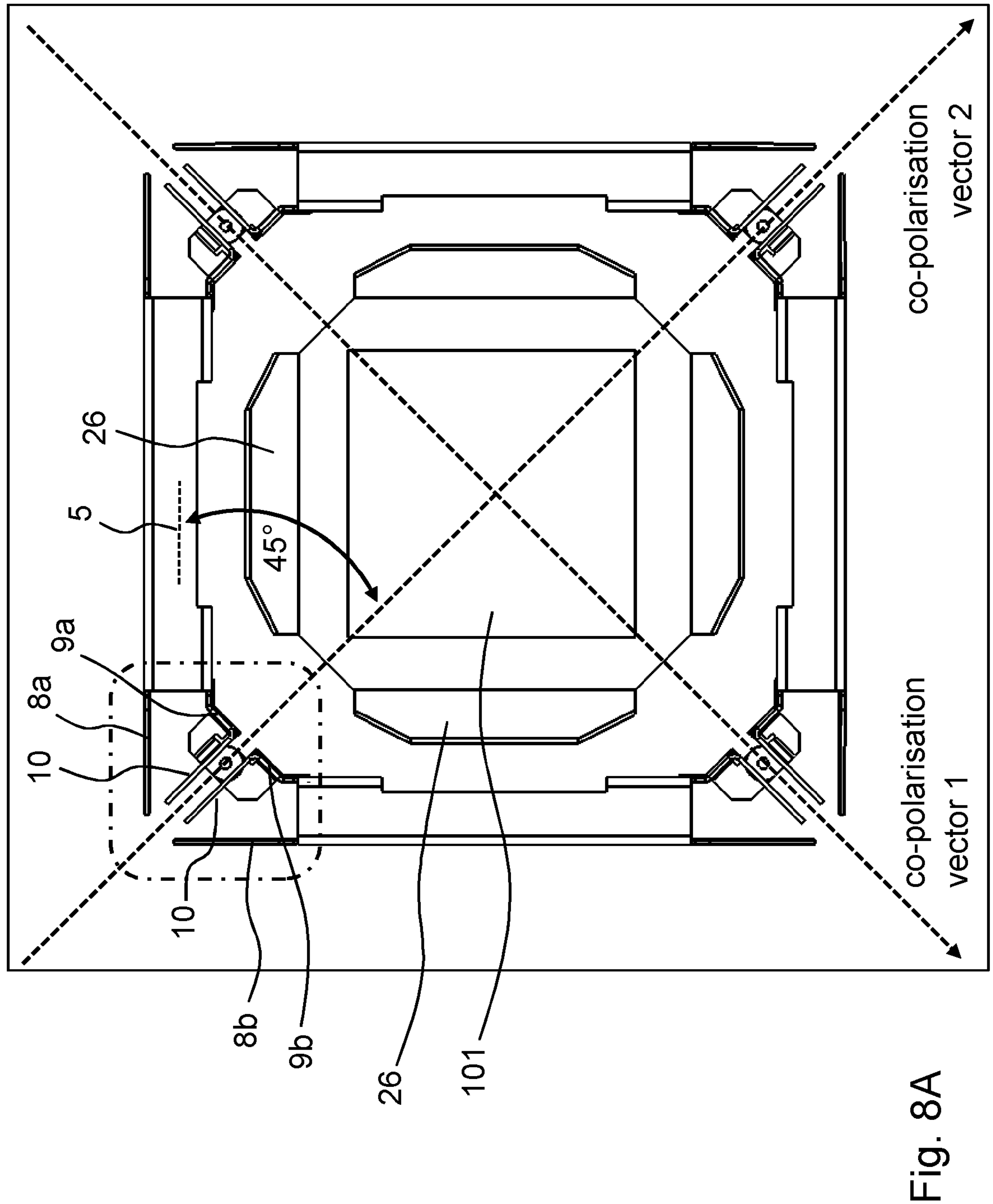
FIG. 8A: characteristics of the embodiment in FIG. 7B.

FIG. 8A shows the topview of the at least one dual-polarized radiator arrangement 1 and one dual-polarized radiator system 101.

The radiator arrangement 1 is linear orthogonal polarized and the minor radiating surface 5 extends mainly parallel to the reflector arrangement 2 and in an angle of around 45° or 135° to the co polarization vector in mainbeam direction.

Furthermore, the shortest distance (line) between the first main radiating surface 8*a* of a radiator segment 4*a*, 4*b*, 4*c*, 4*d* to the second main radiating surface 8*b* of a neighboring radiator segment 4*a*, 4*b*, 4*c*, 4*d* is orthogonal to one co-polarization vector in mainbeam direction and parallel to the other co-polarization vector in mainbeam direction.

The subreflector 26 expands here mainly parallel to the reflector arrangement 2. In addition, a part (preferably at the ends) of the subreflector 26 could also expand slanted to the reflector arrangement 2. Furthermore, the subreflector 26 has a lower metal to metal distance towards the main radiating surfaces 8*a*, 8*b* than towards the minor radiating surfaces 5.

The subreflector 26 can be used with or without the dual-polarized radiator system 101. For example, for decoupling between the ports of the dual-polarized radiator arrangement 1 and/or the ports of the dual-polarized radiator system 101.

The area inside the dashdotted line is seen as one main differentiator for better electrical design and performance. Beside the bandwidth enhancement from the coupling surfaces 10 following benefits are seen.

The first and/or second feed structure 9*a*, 9*b* is located close to the first and second main radiating surfaces 8*a*, 8*b* of the dual-polarized radiator arrangement 1. The first and second main radiating surfaces 8*a*, 8*b* are preferably arranged closely to the first and/or second feed structure 9*a*, 9*b* and/or the coupling surfaces 10. The first and second main radiating surfaces 8*a*, 8*b* are strongly interacting with the first and second feed structure 9*a*, 9*b* and/or the coupling surfaces 10.

The first and/or second feed structure 9*a*, 9*b* is located in close distance to the main radiating surfaces 8*a*, 8*b*. Preferably the minimum distance between the respective main radiating surfaces 8*a*, 8*b* and the nearest first or second feed structure 9*a*, 9*b* is less than 0.1λ, more preferably less than 0.05λ, and the maximum distance between 8*a* and the nearest 9*b* is under 0.15λ, more preferably under 0.1λ, with λ is the center frequency of the lowest used resonance frequency range. Furthermore, the maximum distance between the respective main radiating surfaces 8*a*, 8*b* and the nearest first or second feed structure 9*a*, 9*b* is preferably less than 0.3λ, more preferably less than 0.2λ, wherein λ is the center frequency of the lowest used resonance frequency range. The first and/or second feed structure 9*a*, 9*b* is acting as electrical shielding and/or isolation enhancement between the main radiating surfaces 8*a*, 8*b* of the dual-polarized radiator arrangement 1 and the dual-polarized radiator system 101.

The design and the electrical parameters of the dual-polarized radiator arrangement 1 are more independent from the design and the electrical parameters of the dual-polarized radiator system 101.

The dual-polarized radiator arrangement 1 has surprisingly similar electrical values with and without a dual-polarized radiator system 101.

Furthermore, the dual-polarized radiator arrangement 1 has surprisingly similar electrical values for different distances of the dual-polarized radiator system 101 to the reflector arrangement 2.

Figure 8B:
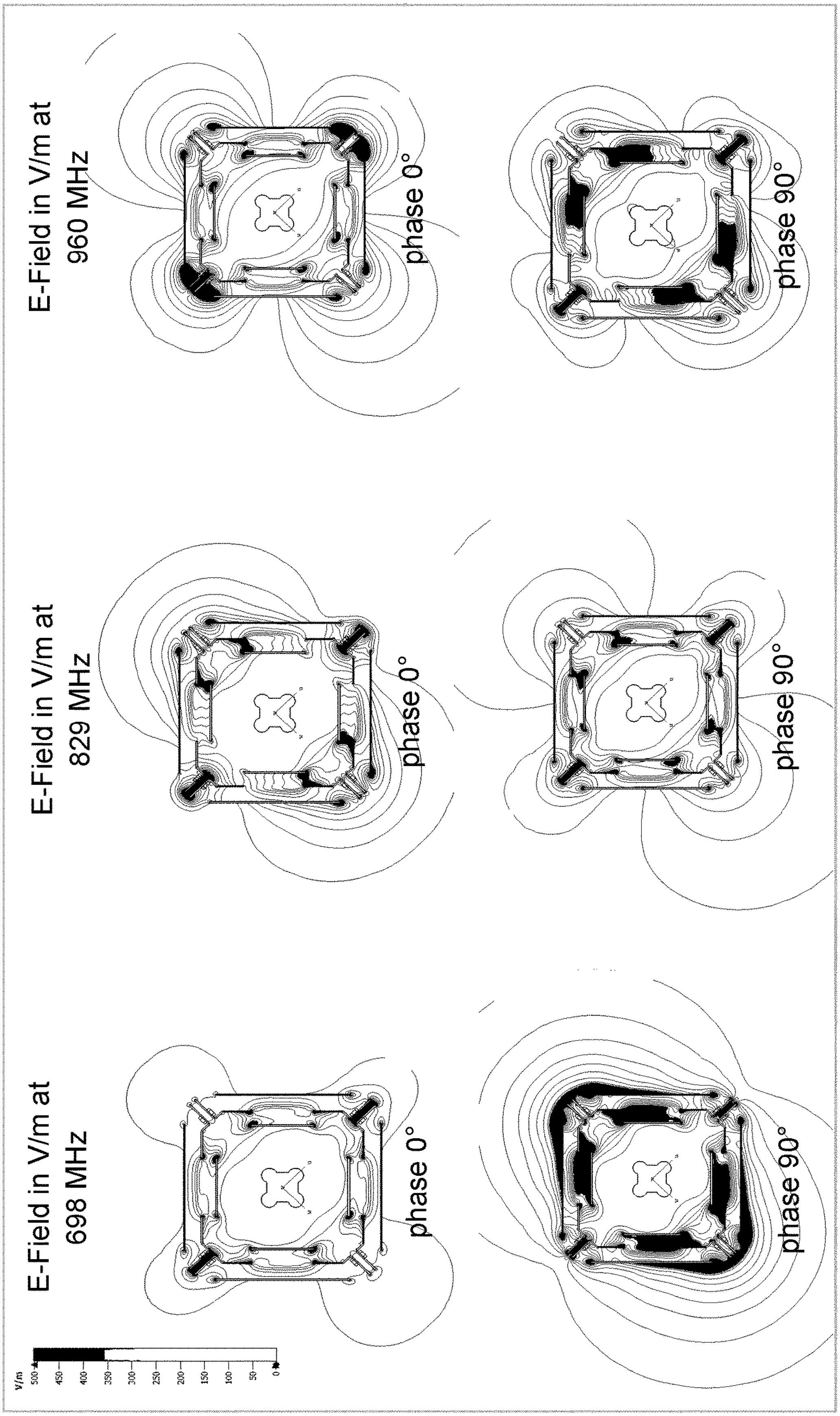
FIG. 8B: electrical field contour plots of the embodiment in FIG. 7B.

FIG. 8B shows 2D contour plots for the electrical field of an embodiment of the at least one dual-polarized radiator arrangement 1 and the dual-polarized radiator system 101. The electrical field is plotted in a plane parallel to the reflector arrangement 2 at the height of the subreflector 26 at frequencies of 698 MHz, 829 MHz and 960 MHz. And for each frequency for the phase 0° and phase 90°, representing two different points in time.

As can be seen, high electrical field strengths occur between the first and second main radiating surfaces 8*a*, 8*b* and the first and second feed structure 9*a*, 9*b* and the coupling surfaces 10 are high electrical field strengths; The center of the dual-polarized radiator arrangement 1 shows low field strengths. For one excited polarization, high electrical field strengths occur as well between at the coupling surfaces 10 that are in the orthogonal polarization plane, not in the excited polarization plane. Furthermore, high electrical field strengths occur between the feed structure 9*a*, 9*b* and the subreflector 26. Low electrical field strengths occur between the main radiating surfaces 8*a*, 8*b* and the subre-Hector 26.

As can be seen, the first and second feed structure 9*a*, 9*b* is acting together with the subreflector 26 as electrical shielding and/or isolation enhancement and/or decoupling element between the first and second main radiating surfaces 8*a*, 8*b* of the dual-polarized radiator arrangement 1 and the dual-polarized radiator system 101.

The high isolation between the two polarizations of the at least one dual-polarized radiator arrangement 1 and the additional low coupling to the at least one dual-polarized radiator system 101 allows a compact antenna design.

For example, in one embodiment the dual-polarized radiator arrangement 1 with the at least one dual-polarized radiator system 101 as shown in FIG. 7B are placed in the center of a reflector arrangement 2 with dimensions of 400 mm to 400 mm. In this case, the connection ports 16*a*, 17*a* have a return loss better than 15 dB for most frequencies, at least better than 10 dB over all frequencies. Furthermore, the isolation between the two connection ports 16*a*, 17*a* is higher than 35 dB over all the working frequencies. Furthermore, in boresight direction (main radiation direction) the directivity is higher than 8 dBi and the cross polar discrimination (XPD) is better than 35 dB for all frequencies. Furthermore, sidelobe levels are below −10 dBi for all the working frequencies. Furthermore, the coupling between the dual-polarized radiator arrangement 1 and one realistic dual-polarized radiator system 101 in the frequency range 1700 MHz to 2700 MHz is lower than 25 dB.

Figure 9B:
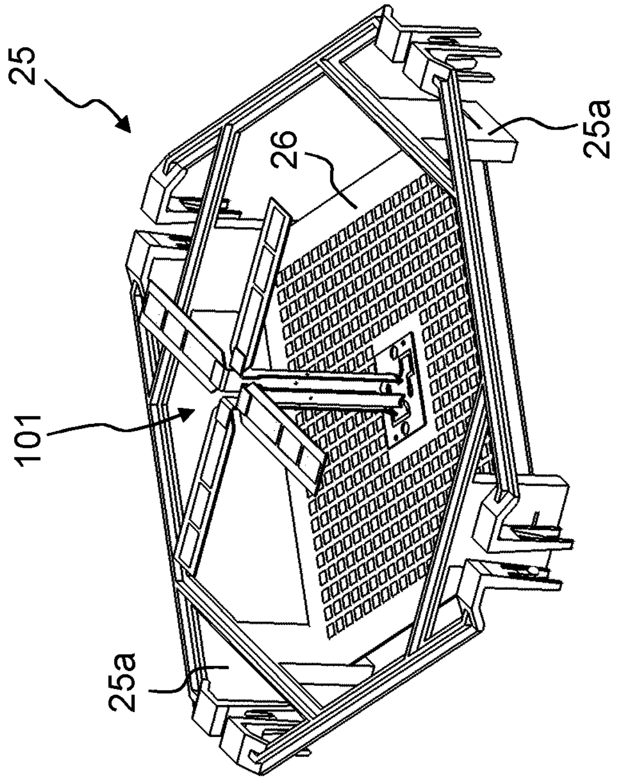
FIG. 9B: an embodiment of at least one dual-polarized radiator system 101.
Figure 9A:
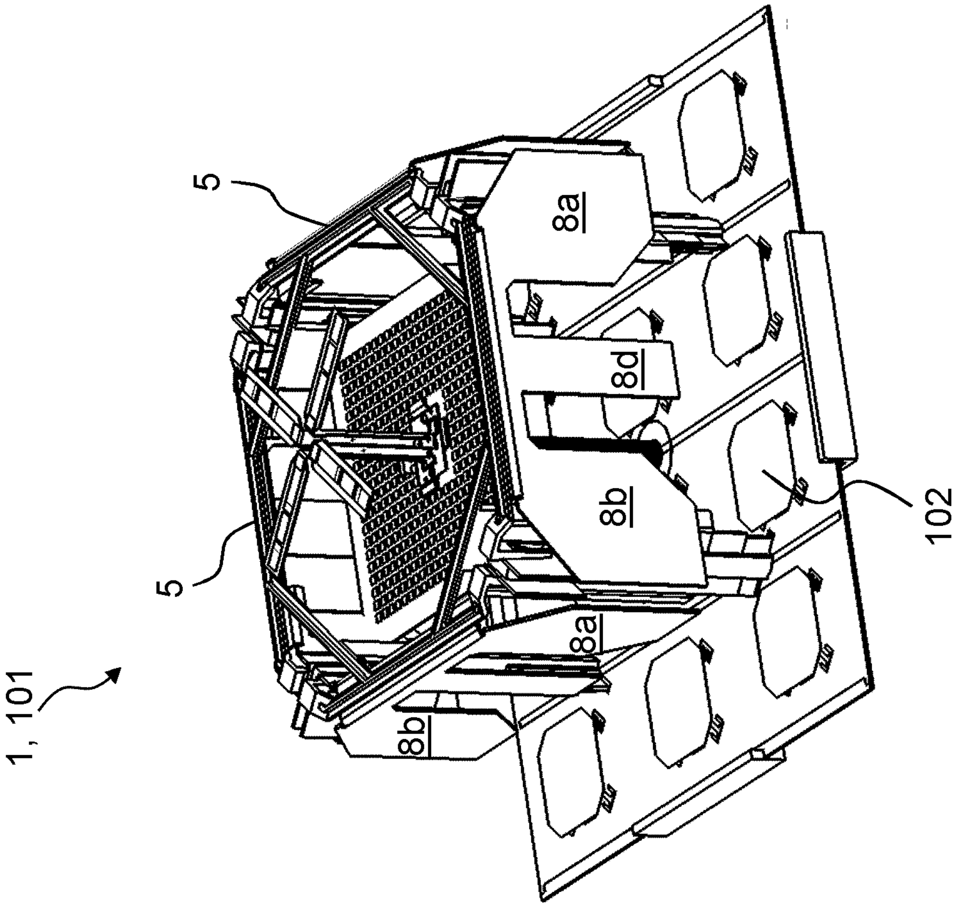
FIG. 9A: a part of the mobile communication antenna comprising the at least one dual-polarized radiator arrangement, at least one dual-polarized radiator system and at least a plurality of dual-polarized high-band patch radiators.

FIG. 9A shows a part of the mobile communication antenna 100 comprising the at a least one dual-polarized radiator arrangement 1, at least one dual-polarized radiator system 101 and at least a plurality of dual-polarized high-band radiators 102. The at least one dual-polarized radiator system 101 is arranged in the receiving area 3 enclosed by the respective radiator segments 4*a*, 4*b*, 4*c*, 4*d*.

The dual-polarized radiator arrangement 1 is configure to operate in the frequency range of 698 MHz to 960 MHz. The at least one dual-polarized radiator system 101 is configured to operate in the frequency range of 1700 MHz to 2700 MHz. The dual-polarized high-band radiators 102 are configured to operate in the frequency range of 3300 MHz to 3800 MHz.

The subreflector 26 is a metallized PCB or metallized plastic and comprises a metal structure that is acting as reflecting structure and/or directional structure for the dual-polarized radiator system 101 and acting as electrically transparent structure and/or directional structure for the plurality of dual-polarized high-band radiators 102.

In one preferred embodiment, the subreflector 26 is a planar lens structure designed for the frequency range of the dual-polarized high-band radiators 102.

In another preferred embodiment, the subreflector 26 is a metamaterial structure, more precisely an artificial structure that is transparent for electromagnetic fields of certain frequencies.

In another preferred embodiment, the subreflector 26 is a frequency-selective surface (FFS), more precisely a repetitive surface designed to reflect, transmit or absorb electromagnetic fields based on the frequency of the field. For such frequency-selective surfaces, a wide range of different forms can be selected. Typical forms are circles, squares, crosses or hexagonal loops which are periodically or aperiodically arranged.

The holding device 20 is configured to hold the radiator segments 4*a*, 4*b*, 4*c*, 4*d* in position. Preferably, the base portion 21 and the top portion 25 of the holding device 20 are additionally holding the dual-polarized radiator system 101. Not shown but easy imaginable is that the holding device 20 is additionally holding at least one part of the dual-polarized radiator system 101, for example the feeding PCB, or at least one part of the plurality of dual-polarized high-band radiators 102, for example the feeding network.

In one preferred embodiment, the subreflector 26 is a sheetmetal part. In another preferred embodiment, the subreflector 26 is a foil or a PCB or a plastic part with metallization.

In one preferred embodiment, the holding device 25 consists of or comprises dielectric material with a relative permittivity $\varepsilon_r$ of preferably more than 1. Preferably, the $\varepsilon_r$ is between 2 and 5.

In one preferred embodiment, the holding device 25 and the subreflector 26 are made as one molded interconnect device (MID), with partial metallization on at least one side.

In another preferred embodiment, the holding device 20 and the subreflector 26 are made as one molded interconnect device (MID), with partial metallization on at least one side.

The partial metallization is for example a laser direct structuring (LDS) process or plating on plastics (POP) process.

FIG. 9B shows the at least one dual-polarized radiator system 101 and the holding device 25 and the subreflector 26 in more detail. The position 25*a* can be a fixed or removable mechanical interconnection. Here it can be seen that the holding device 25 and the subreflector 26 can be realized as one molded interconnect (MID) device, with partial metallization on at least one side.

As can be seen, the mobile communication antenna 100 is ultra-compact.

The dual-polarized radiator system 101 protrudes beyond the dual-polarized radiator arrangement 1.

In another embodiment, the dual-polarized radiator system 101 does not protrude beyond the dual-polarized radiator arrangement 1. Keeping all radiating elements of all radiation systems as close as possible to the reflector arrangement 2 reduces cost, for example material costs and fixation costs due to mechanical tolerances and forces.

The distance of the radiating elements in the dual-polarized radiator system 101 to the reflector arrangement 2 is a free design parameter, depending on the frequency range and/or volume and/or form factor and/or radiation characteristics of the dual-polarized radiator arrangement 1 and the dual-polarized radiator system 101.

Preferably, at least two dual-polarized radiator systems 101 are arranged on the same reflector arrangement 2 and having a transmission line radiator combining network arranged on the first side and/or second (opposite) side of the reflector arrangement 2. More precisely, the transmission line radiator combining network is a microstripline or stripline.

In the following some advantages of the dual-polarized radiator arrangement 1 are emphasized separately.

The dual-polarized radiator arrangement 1 preferably comprises the following feature:

the connecting surface 8*c* extends:

a) as far in the direction of the reflector arrangement 2 as the first and second main radiating surfaces 8*a*, 8*b*; or b) less far in the direction of the reflector arrangement 2 than the first and second main radiating surfaces 8*a*, 8*b*.

The dual-polarized radiator arrangement 1 preferably comprises the following feature:

each radiator segment 4*a*, 4*b*, 4*c*, 4*d* is of single-piece construction.

The dual-polarized radiator arrangement 1 preferably comprises the following feature:

each radiator segment 4*a*, 4*b*, 4*c*, 4*d* is a punched, bent and/or laser cut part.

The dual-polarized radiator arrangement 1 preferably comprises the following feature:

all radiator segments 4*a*, 4*b*, 4*c*, 4*d* consist of a combined punching, bending and/or laser cutting part The dual-polarized radiator arrangement 1 preferably comprises the following feature:

at least one radiator segment 4*a*, 4*b*, 4*c*, 4*d* is constructed in at least two pieces, with both pieces being electrically coupled to each other via coupling elements.

The dual-polarized radiator arrangement 1 preferably comprises the following feature:

at least one radiator segment 4*a*, 4*b*, 4*c*, 4*d* or all radiator segments 4*a*, 4*b*, 4*c*, 4*d* are completely free of solder joints; or at least one radiator segment 4*a*, 4*b*, 4*c*, 4*d* or all radiator segments 4*a*, 4*b*, 4*c*, 4*d* are free of solder joints at least in the area of the first and second main radiator surface 8*a*, 8*b* and the minor radiating surface 5.

The dual-polarized radiator arrangement 1 preferably comprises the following feature:

all radiator segments 4*a*, 4*b*, 4*c*, 4*d* have the identical form.

The dual-polarized radiator arrangement 1 preferably comprises the following feature:

the first and second main radiating surfaces 8*a*, 8*b* of a radiator segment 4*a*, 4*b*, 4*c*, 4*d* run in a common plane, which is in particular perpendicular to the reflector arrangement 2.

The dual-polarized radiator arrangement 1 preferably comprises the following feature:

the first and second main radiating surfaces 8*a*, 8*b* have a length corresponding to at least 30%, 40%, 50%, 60% or 70% of the distance from the minor radiating surface 5 towards the reflector arrangement 2 but preferably less than 80% of this distance.

The dual-polarized radiator arrangement 1 preferably comprises the following feature:

the first and second main radiating surfaces 8*a*, 8*b* of a radiator segment 4*a*, 4*b*, 4*c*, 4*d* are essentially rectangular, L-shaped, T-shaped.

The dual-polarized radiator arrangement 1 preferably comprises the following feature:

the holding device 20 is constructed in one piece.

The dual-polarized radiator arrangement 1 preferably comprises the following feature:

the holding device 20 consists of or comprises a dielectric.

The dual-polarized radiator arrangement 1 preferably comprises the following feature:

each radiator segment 4*a*, 4*b*, 4*c*, 4*d* is electrically conductive.

The dual-polarized radiator arrangement 1 preferably comprises the following feature:

the first and third feeding system 12*a*, 12*c* are constructed in one piece and the second and fourth feeding system 12*b*, 12*d* are constructed in one piece.

The dual-polarized radiator arrangement 1 preferably comprises the following feature:

the connection line 16 between the first and third feeding systems 12*a*, 12*c* crosses without galvanic contact the connection line 17 between the second and fourth feeding systems 12*b*, 12*d* or the connection line 16 between the first and third feeding systems 12*a*, 12*c* is arranged without an overlapping portion next to the connection line 17 between the second and fourth feeding systems 12*b*, 12*d*.

The dual-polarized radiator arrangement 1 preferably comprises the following feature:

adjacent first and second feed structures 9*a*, 9*b* are galvanic or capacitively coupled to each other by a coupling surface 10.

The dual-polarized radiator arrangement 1 preferably comprises the following feature:

the first or second feed structure 9*a*, 9*b* of each radiator segment 4*a*, 4*b*, 4*c*, 4*d* forms an angle to the first or second main radiating surface 8*a*, 8*b* of the same radiator segment 4*a*, 4*b*, 4*c*, 4*d*, the angle being approximately 45°.

The dual-polarized radiator arrangement 1 preferably comprises the following feature:

the coupling surface 10 forms an angle of approx. 90° to the rest of the respective feed structure 9*a*, 9*b*.

The dual-polarized radiator arrangement 1 preferably comprises the following features:

the first feed structure 9*a* of the first radiator segment 4*a* and the second feed structure 9*b* of the fourth radiator segment 4*d* are angled relative to the inner edge 7*a* of the respective minor radiator surface 5 in such a way that the first feed structure 9*a* of the first radiator segment 4*a* and the second feed structure 9*b* of the fourth radiator segment 4*d* are parallel to each other or are arranged in a common plane; and/or the first feed structure 9*a* of the first radiator segment 4*a* and the second feed structure 9*b* of the fourth radiator segment 4*d* are bent towards each other; and/or the first feed structure 9*a* of the second radiator segment 4*b* and the second feed structure 9*b* of the first radiator segment 4*a* are angled relative to the inner edge 7*a* of the respective minor radiator surface 5 in such a way that the first feed structure 9*a* of the second radiator segment 4*b* and the second feed structure 9*b* of the first radiator segment 4*a* are parallel to each other or are arranged in a common plane; and/or the first feed structure 9*a* of the second radiator segment 4*b* and the second feed structure 9*b* of the first radiator segment 4*a* are bent towards each other; and/or the first feed 9*a* structure of the third radiator segment 4*c* and the second feed structure 9*b* of the second radiator segment 4*b* are angled relative to the inner edge 7*a* of the respective minor radiator surface 5 in such a way that the first feed structure 9*a* of the third radiator segment 4*c* and the second feed structure 9*b* of the second radiator segment 4*b* are parallel to each other or are arranged in a common plane; and/or the first feed structure 9*a* of the third radiator segment 4*c* and the second feed structure 9*b* of the second radiator segment 4*b* are bent towards each other; and/or the first feed structure 9*a* of the fourth radiator segment 4*d* and the second feed structure 9*b* of the third radiator segment 4*c* are angled relative to the inner edge 7*a* of the respective minor radiator surface 5 in such a way that the first feed structure 9*a* of the fourth radiator segment 4*d* and the second feed structure 9*b* of the third radiator segment 4*c* are parallel to each other or are arranged in a common plane; and/or the first feed structure 9*a* of the fourth radiator segment 4*d* and the second feed structure 9*b* of the third radiator segment 4*c* are bent towards each other.

The dual-polarized radiator arrangement 1 preferably comprises the following feature:

the respective first, second, third and fourth feed systems 12*a*, 12*b*, 12*c*, 12*d* and/or the connecting lines 16, 17 are made of sheetmetal forming an air microstripline; or the respective first, second, third and fourth feed systems 12*a*, 12*b*, 12*c*, 12*d* and/or the connecting lines 16, 17 are made of a PCB forming an microstripline; or the respective first, second, third and fourth feed systems 12*a*, 12*b*, 12*c*, 12*d* and/or the connecting lines 16, 17 are made as one molded interconnect device (MID), with partial metallization on at least one side, forming an air microstripline or microstripline The dual-polarized radiator arrangement 1 preferably comprises the following feature:

the base portion 21 of the holding device 20 and the respective first, second, third and fourth feed systems 12*a*, 12*b*, 12*c*, 12*d* and the connecting lines 16, 17 are made as one molded interconnect device (MID), with partial metallization on at least one side; or the respective first, second, third and fourth feed systems 12*a*, 12*b*, 12*c*, 12*d* and/or the connecting lines 16, 17 are made as printed circuit boards and the base portion 21 of the holding device 20 fixates one or more printed circuit boards with the metallization of the respective first, second, third and fourth feed systems 12*a*, 12*b*, 12*c*, 12*d* and/or the connecting lines 16, 17. or the connecting lines 16, 17 are made of at least one printed circuit board and the base portion 21 of the holding device fixates the at least one printed circuit board.

The dual-polarized radiator arrangement 1 preferably comprises the following feature:

the minor radiating surface 5 of each radiator segment 4*a*, 4*b*, 4*c*, 4*d* extends mainly parallel to the reflector arrangement 2 and in an angle of around 45° or 135° to the co polarization vector in mainbeam direction; and/or the shortest distance line between a first main radiating surface 8*a* of a radiator segment 4*a*, 4*b*, 4*c*, 4*d* and a second main radiating surface 8*b* of a neighboring radiator segment 4*a*, 4*b*, 4*c*, 4*d* is orthogonal to one co-polarization vector in mainbeam direction and parallel to the other co-polarization vector in mainbeam direction.

The dual-polarized radiator arrangement 1 preferably comprises the following feature:

high electrical fields are established between the first and second main radiating surfaces 8*a*, 8*b* and the feed structures 9*a*, 9*b;* high electrical fields are established between the first and second main radiating surfaces 8*a*, 8*b* and the coupling surfaces 10;

low electrical fields are established between the main radiating surfaces 8*a*, 8*b* and the subreflector 26; and/or the first and second main radiating surfaces 8*a*, 8*b* are capacitively loaded and/or electrically shielded by the first and second feed structure 9*a*, 9*b* and/or the coupling surfaces 10;

The dual-polarized radiator arrangement 1 in combination with at least one dual-polarized radiator system 101 preferably comprises the following feature:

The first and/or second feed structure 9*a*, 9*b* is located in close distance to the main radiating surfaces 8*a*, 8*b*. Preferably the minimum distance between the respective main radiating surfaces 8*a*, 8*b* and the nearest first and/or second feed structure 9*a*, 9*b* is less than 0.1λ, more preferably less than 0.05λ, and the maximum distance between the respective main radiating surfaces 8*a*, 8*b* and the nearest first and/or second feed structure 9*a*, 9*b* is preferably less than 0.15λ, more preferably less than 0.1λ, wherein λ is the center frequency of the lowest used resonance frequency range. Furthermore the maximum distance between the respective main radiating surfaces 8*a*, 8*b* and the nearest first and/or second feed structure 9*a*, 9*b* is preferably less than 0.3λ, more preferably less than 0.2λ, wherein λ is the center frequency of the lowest used resonance frequency range; and/or the first and/or second feed structure 9*a*, 9*b* act as electrical shielding and/or isolation enhancement between the first and second main radiating surfaces 8*a*, 8*b* of the dual-polarized radiator arrangement 1 and the dual-polarized radiator system 101.

The dual-polarized radiator arrangement 1 in combination with at least one dual-polarized radiator system 101 preferably comprises the following feature:

the at least one dual-polarized radiator system 101 is preferably arranged on a subreflector 26 if the radiating elements of the dual-polarized radiator system 101 are further away from the reflector arrangement 2 than 0.25*λ or 0.5*λ or 0.75*λ or 1λ, where λ is the center frequency of the working frequency range of the at least one dual-polarized radiator system 101, preferably the lowest working frequency range; or the at least one dual-polarized radiator system 101 is preferably arranged directly on the reflector arrangement 2, without a subreflector 26, if the radiating elements of the dual-polarized radiator system 101 are placed closer to the reflector arrangement 2 than 0.45*λ or 0.35*λ or 0.25*λ or 0.15*λ, where λ is the center frequency of the working frequency range of the at least one dual-polarized radiator system 101, preferably the lowest working frequency range.

The dual-polarized radiator arrangement 1 in combination with at least one dual-polarized radiator system 101 preferably comprises the following feature:

a holding device 20 or one part of a holding device 20, in particular the base portion 21 or the top portion 25, holds the dual-polarized radiator arrangement 1 and in addition at least one subreflector 26 and/or at least one part of the dual-polarized radiator system 101; and/or a holding device 20 or one part of a holding device 20, in particular the base portion 21 or the top portion 25, and at least one subreflector 26 are made as one molded interconnect device (MID), with partial metallization on at least one side.

The dual-polarized radiator arrangement 1 in combination with at least one dual-polarized radiator system 101 and/or in combination with a plurality of dual-polarized high-band radiators 102 preferably comprises the following feature:

a holding device 20 or one part of a holding device 20, in particular the base portion 21 or the top portion 25, holds the dual-polarized radiator arrangement 1 and in addition at least one subreflector 26 and/or at least one part of the dual-polarized radiator system 101 and/or at least one part of the dual-polarized high-band radiators 102;

a holding device 20 or one part of a holding device 20, in particular the base portion 21 or the top portion 25, and at least one subreflector 26 are made as one molded interconnect device (MID), with partial metallization on at least one side;

The dual-polarized radiator arrangement 1 in combination with at least one dual-polarized radiator system 101 and/or in combination with a plurality of dual-polarized high-band radiators 102 preferably comprises the following feature:

at least one subreflector 26 that expands mainly parallel to the reflector arrangement 2; and/or at least one subreflector 26 that expands partly parallel to the reflector arrangement 2 and partly slanted to the reflector arrangement 2; and/or at least one subreflector 26 has a lower metal to metal distance towards the main radiating surfaces 8*a*, 8*b* than towards the minor radiating surfaces 5. and/or at least one subreflector 26 has an electrically reflective metallization structure and/or directional metallization structure for at least one dual-polarized radiator system 101; and/or at least one subreflector 26 has an electrically transparent metallization structure and/or directional metallization structure for a plurality of dual-polarized high-band radiators 102; and/or at least one subreflector 26 has a planar lens structure and/or metamaterial structure and/or a frequency-selective surface (FFS).

The subreflector 26 preferably comprises the following feature:

the subreflector 26 is a sheetmetal part or metallized foil or a PCB or a plastic part with metallization.

The holding device 20 preferably comprises the following feature:

the dielectric material of the base portion 21 of the holding device is more concentrated under the connecting lines 16, 17.

the dielectric material of the holding device base portion 21 is partly in the form of a spider web or not in the form of a spider web.

The dual-polarized radiator arrangement 1 in combination with a plurality of dual-polarized high-band radiators 102 preferably comprises the following feature:

the dual-polarized high-band radiators 102 are dual-polarized patch radiators or dual-polarized dipole radiators.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A dual-polarized radiator for a mobile communication antenna, comprising:

four radiator segments; and a reflector, wherein the four radiator segments are arranged on the reflector, each radiator segment is arranged at a 90° rotation relative to its two neighbouring radiator segments so that the four radiator segments form a square and enclose a receiving area, each radiator segment comprises a minor radiating surface having a first end and a second end, each minor radiating surface is arranged substantially parallel to and spaced apart from the reflector, the minor radiating surface of each radiator segment extends in a longitudinal direction and in a transverse direction, wherein the extension in the longitudinal direction being larger than the extension in the transverse direction, each radiator segment comprises a feeding assembly, each radiator segment comprises a first and a second main radiating surface, for each radiator segment, the first main radiating surface of the radiator segment is arranged in the area of the first end of the minor radiating surface and runs in the direction of the reflector, for each radiator segment, the second main radiating surface of the radiator segment is arranged in the area of the second end of the minor radiating surface and runs in the direction of the reflector, for each radiator segment, the first main radiating surface of the radiator segment protrudes beyond the first end of the minor radiating surface in the longitudinal direction of the minor radiating surface, and for each radiator segment, the second main radiating surface of the radiator segment protrudes beyond the second end of the minor radiating surface in the longitudinal direction of the minor radiating surface.

2. The dual-polarized radiator of claim 1, wherein the feeding assembly of each radiator segment comprises a first feed structure and a second feed structure, wherein the first feed structure extends from the region of the first end of the minor radiating surface towards the reflector and wherein the second feed structure extends from the region of the second end of the minor radiating surface towards the reflector, the first main radiating surface is arranged in the transverse direction of the minor radiating surface at a distance from the first feed structure in the direction of the reflector, and the second main radiating surface is arranged in the transverse direction of the minor radiating surface at a distance from the second feed structure in the direction of the reflector.

3. The dual-polarized radiator of claim 2, wherein the first feed structure of each radiator segment is bent in the direction of the nearest second feed structure of the respective adjacent radiator segment;

the second feed structure of each radiator segment is bent in the direction of the nearest first feed structure of the respective adjacent radiator segment;

the first and second feed structures of respective adjacent radiator segments are bent towards each other and are aligned parallel to each other or run through the same plane.

4. The dual-polarized radiator of claim 3, wherein four feeding systems are provided;

each feeding system comprises a first feed section and a second feed section, the second feed section is galvanically connected to the first feed section; and one feed system each is arranged parallel to and fac-ing one first feed structure of the respective radiator segment and parallel to and facing the nearest second feed structure of the radiator segment adjacent to the respective radiator segment with the first feed structure.

5. The dual-polarized radiator of claim 4, wherein the first feed sections of the first and third feeding systems are interconnected and configured to transmit and/or receive a mo-bile radio signal in a first polarization;

the first feed section of the first feeding system is adjacent to the first feed structure of the first radiator segment or to the second feed structure of the fourth radiator segment, and wherein the second feed section of the first feeding system is adjacent to the second feed structure of the fourth radiator segment or to the first feed structure of the first radiator segment; and the first feed section of the third feeding system is adjacent to the first feed structure of the third radiator segment or to the second feed structure of the second radiator segment, and wherein the second feed section of the third feeding system is adjacent to the second feed structure of the second radiator segment or to the first feed structure of the third radiator segment; and/or the first feed sections of the second and fourth feeding systems are interconnected and are configured to transmit and/or receive a mobile radio signal in a second polarization;

the first feed section of the second feeding system is adjacent to the first feed structure of the second radiator segment or to second feed structure of the first radiator segment, and wherein the second feed section of the second feeding system is adjacent to the second feed structure of the first radiator segment or to the first feed structure of the second radiator segment; and the first feed section of the fourth feeding system is adjacent to the first feed structure of the fourth radiator segment or to the second feed structure of the third radiator segment, and wherein the second feed section of the fourth feeding system is adjacent to the second feed structure of the third radiator segment or to the first feed structure of the fourth radiator segment.

6. The dual-polarized radiator of claim 2, wherein the first feed structure of the respective radiator segment:

a) is galvanically connected to the reflector; or b) is capacitively coupled to the reflector; or c) ends at a distance from the reflector; and/or the second feed structure of the respective radiator segment:

a) is galvanically connected to the reflector; or b) is capacitively coupled to the reflector; or c) ends at a distance from the reflector.

7. The dual-polarized radiator of claim 2, wherein the first and second feed structures of each radiator segment comprise a coupling surface;

the coupling surfaces of the first and second feed structures of adjacent radiator segments are aligned parallel to each other, resulting in capacitive coupling.

8. The dual-polarized radiator of claim 7, wherein a holding device is provided;

the holding device is configured to hold the radiator segments in position;

the holding device comprises at least four holding arms, wherein each holding arm consists of or comprises a dielectric material and wherein each holding arm engages between two adjacent coupling surfaces.

9. The dual-polarized radiator of claim 2, wherein each minor radiating surface of the four radiator segments comprises an inner edge which runs in the longitudinal direction of the minor radiating surface and points towards the receiving area;

each minor radiating surface of the four radiator segments comprises an outer edge which extends in the longitudinal direction of the minor radiating surface and is spaced from the inner edge in the transverse direction of the minor radiating surface;

the first feed structure of each radiator segment is located at the inner edge of the respective minor radiating surface;

the second feed structure of each radiator segment is located at the inner edge of the respective minor radiating surface;

the first main radiating surface of each radiator segment is arranged at the outer edge of the respective minor radiating surface;

the second main radiating surface of each radiator segment is arranged at the outer edge of the respective minor radiating surface.

10. The dual-polarized radiator of claim 1, wherein the first and second main radiating surfaces of at least one or all of the respective radiator segments are connected to each other via a connecting surface.

11. The dual-polarized radiator of claim 1, wherein an auxiliary radiator surface is provided;

the auxiliary radiator surface is arranged at the minor radiating surface between the first and second main radiating surfaces of at least one or all radiator segments and extends in the direction of the reflector.

12. The dual-polarized radiator of claim 11, wherein the at least one auxiliary radiator surface extends further in the direction of the reflector than the first and second main radiating surfaces of the respective radiator segment.

13. The dual-polarized radiator of claim 11, wherein the auxiliary radiator surface is inclined in the direction of the receiving area.

14. The dual-polarized radiator of claim 11, wherein the auxiliary radiator surface is located at the inner edge or the outer edge of the minor radiating surface of the respective radiator segment.

15. A mobile communication antenna comprising the dual-polarized radiator of claim 1, wherein at least one dual-polarized radiator system is provided, which is configured to transmit and/or receive mobile radio signals in two different polarizations;

the at least one dual-polarized radiator system is configured to be operable in a frequency range which is above the frequency range of the dual-polarized radiator;

the at least one dual-polarized radiator system is arranged in the receiving area of the at least one dual-polarized radiator;

a plurality of dual-polarized high-band radiators are provided, which are configured to transmit and/or receive mobile radio signals in two different polarizations;

the plurality of dual-polarized high-band radiators are configured to be operable in a frequency range which is above the frequency range of the dual-polarized radiator system;

the plurality of dual-polarized high-band radiators are arranged on the reflector.

16. The mobile communication antenna of claim 15, wherein at least one subreflector:

a) expands mainly parallel to the reflector 2; or b) the at least one subreflector is electrically reflective or direction-al for the at least one dual-polarized radiator system; or c) at least one subreflector is electrically transparent or directional for a plurality of dual-polarized radiators; or d) at least one subreflector is a planar lens structure or metamaterial structure or a frequency-selective surface.

17. The mobile communication antenna of claim 15, wherein the dual-polarized radiator further comprises a holding device;

the holding device is configured to hold the radiator segments in position;

the holding device comprises at least four holding arms, wherein each holding arm comprises a dielectric material and wherein each holding arm engages between two adjacent coupling surfaces, the holding device or one part of the holding device holds at least the dual-polarized radiator and in addition a) at least one subreflector; and/or b) at least one part of a dual-polarized radiator system; and/or c) at least one part of the plurality of dual-polarized high-band radiators;

and/or the holding device or one part of the holding device and at least one metal part are made as one molded interconnect device, with partial metallization on at least one side;

or the holding device or one part of the holding device, and at least one metal part are made as one molded interconnect device, with partial metallization on at least one side;

the holding device base portion and the feed system and the connecting lines are made as one molded interconnect device, with partial metallization on at least one side;

and/or the holding device comprises a base portion and a top portion-;

the base portion or the top portion and at least one subreflector are made as one molded interconnect device, with partial metallization on at least one side.

* * * * *